US012623198B2

(12) United States Patent
Watanabe

(10) Patent No.: US 12,623,198 B2
(45) Date of Patent: May 12, 2026

(54) METHOD FOR PRODUCING HOLLOW PARTICLES

(71) Applicant: ZEON CORPORATION, Tokyo (JP)

(72) Inventor: Masashi Watanabe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 1008 days.

(21) Appl. No.: 17/778,080

(22) PCT Filed: Dec. 2, 2020

(86) PCT No.: PCT/JP2020/044825
§ 371 (c)(1),
(2) Date: May 19, 2022

(87) PCT Pub. No.: WO2021/112117
PCT Pub. Date: Jun. 10, 2021

(65) Prior Publication Data
US 2022/0355264 A1       Nov. 10, 2022

(30) Foreign Application Priority Data

Dec. 6, 2019    (JP) ................................. 2019-221626
Jun. 4, 2020    (JP) ................................. 2020-097938

(51) Int. Cl.
| | |
|---|---|
| *B01J 13/18* | (2006.01) |
| *C08F 2/18* | (2006.01) |
| *C08F 2/44* | (2006.01) |
| *C08F 265/06* | (2006.01) |

(52) U.S. Cl.
CPC ................. *B01J 13/18* (2013.01); *C08F 2/18* (2013.01); *C08F 2/44* (2013.01); *C08F 265/06* (2013.01)

(58) Field of Classification Search
CPC .......... B01J 13/14; B01J 13/18; B01J 13/203; C08F 2/18; C08F 2/44; C08F 4/04; C08F 6/005; C08F 265/06
See application file for complete search history.

(56) References Cited

FOREIGN PATENT DOCUMENTS

| | | | |
|---|---|---|---|
| JP | 2002-080503 A | 3/2002 | |
| JP | 2003015171 A * | 1/2003 | |
| JP | 2003-181274 A | 7/2003 | |
| JP | 2016-068037 A | 5/2016 | |
| JP | 2016-190980 A | 11/2016 | |
| WO | WO-0170826 A1 * | 9/2001 | ................ C08F 2/18 |

OTHER PUBLICATIONS

English Trans. of JP2003015171 (Year: 2003).*
English trans. of WO-0170826 (Year: 2001).*
International Search Report dated Feb. 16, 2021, issued in counterpart Application No. PCT/JP2020/044825. (3 pages).
Notification of Transmittal of Translation of the International Preliminary Report on Patentability (Form PCT/IB/338) issued in counterpart International Application No. PCT/JP2020/044825 mailed Jun. 16, 2022, with Forms PCT/IB/373 and PCT/ISA/237. (5 pages).

* cited by examiner

*Primary Examiner* — John M Cooney
(74) *Attorney, Agent, or Firm* — WHDA, LLP

(57)       ABSTRACT

The method produces hollow particles which have a high void ratio, which can reduce the residual amount of a sparingly water-soluble solvent used in the production process, and which are less likely to collapse. The method for producing hollow particles which comprise a shell and a hollow portion and which have a void ratio of 50% or more and 90% or less, wherein a suspension treatment of a mixture liquid containing a polymerizable monomer for shell, a polar resin, a hydrocarbon solvent, a sparingly water-soluble inorganic metal salt as a dispersant, and an aqueous medium is carried out to prepare a suspension in which droplets of a monomer composition containing the polymerizable monomer for shell, the polar resin and the hydrocarbon solvent are dispersed in the aqueous medium; a polymerization reaction of the suspension is carried out; and the hydrocarbon solvent is removed from the obtained hollow particles.

4 Claims, 2 Drawing Sheets

METHOD FOR PRODUCING HOLLOW PARTICLES

TECHNICAL FIELD

The present disclosure relates to a method for producing hollow particles. More specifically, the present disclosure relates to a method for producing hollow particles which have a high void ratio, which are less likely to collapse, which can reduce the residual amount of volatile compounds used in a production process, such as a non-reactive hydrocarbon solvent and an unreacted monomer, and especially which are less likely to collapse when mixed with other materials such as a resin.

BACKGROUND ART

Hollow particles produced by polymerizing a monomer (hollow resin particles) can scatter light well and can reduce light transmissivity as compared to resin particles in which their interiors are practically filled with resin; hence, hollow particles are widely used in the applications of, for example, aqueous coating materials and paper coating compositions, as organic pigments and masking agents excellent in optical properties such as opacity and whiteness.

Hollow particles are desired to have a high void ratio in order to improve effects such as weight reduction, acquisition of heat insulation properties, opacification and whitening of aqueous coating materials, paper coating compositions, etc. However, when the void ratio of the hollow particles is increased, there are problems in that the shell thickness of the hollow particles is decreased, and the hollow particles easily collapse. Accordingly, hollow particles which have a high void ratio and which are less likely to collapse, are needed.

Patent Literature 1 discloses a method for producing hollow resin particles, which is characterized in that a mixed solution containing a monomer mixture, which contains 20 to 70 parts by weight of a polyfunctional monomer having two or more ethylenically unsaturated groups and 80 to 30 parts by weight of a monofunctional monomer, a non-reactive organic solvent, and a non-crosslinkable polymer having a polystyrene equivalent weight average molecular weight of 10000 to 1000000, is dispersed in an aqueous solution containing a dispersion stabilizer or a surfactant, and then the solution is polymerized. Patent Literature 1 mentions that hollow resin particles which have a small grain size, which have fewer pin holes and which have less collapses, are provided by the production method.

Patent Literature 2 discloses hollow resin particles such that the particles have one hollow enclosed by a shell and a thermal decomposition initiation temperature of 350° C. or higher, and the shell has a fine through hole having a diameter in the range of 10 nm to 50 nm and has a thickness of the ratio of 0.03 to 0.25 with respect to the average primary particle diameter of the hollow resin particles. Also, Patent Literature 2 mentions that the hollow resin particles are produced by dispersing a mixed solution containing a polyfunctional monomer and a non-reactive solvent in an aqueous solution, and then polymerizing the polyfunctional monomer; the aqueous solution may contain a dispersion stabilizer or a surfactant; and a water-soluble polymerization initiator is preferably used to form the fine through hole having a diameter of 10 nm to 50 nm.

Patent Literature 3 discloses a method for producing hollow polymer fine particles comprising a shell of single layer structure and a hollow portion, in which a mixture of (i) at least one crosslinkable monomer (B) or a mixture of at least one crosslinkable monomer (B) and at least one monofunctional monomer (B'), (ii) an initiator (C) and (iii) a sparingly water-soluble solvent (D) having low compatibility with a polymer or copolymer obtained from the at least one crosslinkable monomer (B) or a copolymer of the at least one crosslinkable monomer (B) and the at least one monofunctional monomer (B') is dispersed in an aqueous solution of a dispersion stabilizer (A), followed by suspension polymerization. Also, Patent Literature 3 mentions that a polymer dispersion stabilizer such as polyvinyl alcohol or a surfactant such as a nonionic surfactant, an anionic surfactant and an amphoteric surfactant can be used as a dispersion stabilizer (A) and among them, a polymer dispersion stabilizer such as polyvinyl alcohol, is preferred.

CITATION LIST

Patent Literatures

[Patent Literature 1] Japanese Patent Application Laid-Open (JP-A) No. 2016-68037
[Patent Literature 2] JP-A No. 2016-190980
[Patent Literature 3] JP-A No. 2002-80503

SUMMARY OF INVENTION

Technical Problem

However, the hollow resin particles obtained by the production method of Patent Literature 1 have the following problem: when a coating material or molding material is produced by mixing the hollow resin particles with a resin, or when a molded body is produced by use of the molding material containing the hollow resin particles, the hollow resin particles cannot sufficiently withstand the shear or pressure of biaxial kneading or injection molding, and they are likely to collapse, accordingly.

Like the hollow resin particles of Patent Literature 1, the hollow resin particles obtained by the production method of Patent Literature 2 have a problem in that they cannot sufficiently withstand the shear or pressure of biaxial kneading or injection molding, and they are likely to collapse, accordingly. In addition, the hollow resin particles obtained by the production method of Patent Literature 2 have the following problem: due to the fine through hole, the resin enters the interior of the particles during injection molding of a molding resin composition containing the hollow resin particles. In addition, while the fine through hole of the hollow resin particles imparts beneficial functions to the hollow resin particles, since the fine through hole is a defect portion of the shell, it decreases the strength of the hollow resin particles and causes the collapse of the hollow resin particles.

The hollow resin particles obtained by the production method of Patent Literature 3 has the following problem: after the hollow resin particles are produced by suspension polymerization, removal of the sparingly water-soluble solvent present in the hollow of the hollow resin particles is difficult, and the sparingly water-soluble solvent is likely to remain in the hollow resin particles. In addition, the residual solvent may cause ignition or smoke during the biaxial kneading of the mixture of the hollow resin particles and the resin.

An object of the present disclosure is to provide a method for producing hollow particles which have a high void ratio, which are less likely to collapse, and which can reduce the residual amount of volatile compounds used in the production process, such as a non-reactive hydrocarbon solvent and an unreacted monomer.

Solution to Problem

For the method for obtaining the hollow particles by suspension polymerization, the inventors of the present disclosure focused on that the type of the resin contained in the mixture liquid used for the suspension polymerization and the type of the dispersant used for the suspension polymerization, are important for the production of the hollow particles which have a high void ratio, which are less likely to collapse, and which can reduce the residual amount of volatile compounds used in the production process, such as a non-reactive hydrocarbon solvent and an unreacted monomer.

According to the present disclosure, a method for producing hollow particles which comprise a resin-containing shell and a hollow portion surrounded by the shell and which have a void ratio of 50% or more and 90% or less, is provided, the method comprising:

a suspension step comprising carrying out a suspension treatment of a mixture liquid containing a polymerizable monomer for shell, a polar resin selected from the group consisting of polymers containing a repeating unit which contains a heteroatom, a hydrocarbon solvent, a sparingly water-soluble inorganic metal salt as a dispersant, and an aqueous medium to prepare a suspension in which droplets of a monomer composition containing the polymerizable monomer for shell, the polar resin and the hydrocarbon solvent are dispersed in the aqueous medium, a polymerization step comprising subjecting the suspension to a polymerization reaction, and a hydrocarbon solvent removal step comprising removing the hydrocarbon solvent included in the hollow particles obtained by the polymerization step.

In the production method, the mixture liquid preferably contains the polar resin in an amount of from 0.1 parts by mass to 10 parts by mass, with respect to 100 parts by mass of the polymerizable monomer for shell.

In the production method, the polar resin is preferably an acrylic polymer.

In the production method, the acrylic polymer as the polar resin is preferably a copolymer of polymerizable monomers for polar resin, which include a methyl methacrylate and a polar group-containing (meth)acrylic monovinyl monomer, and with respect to a total mass (100% by mass) of the polymerizable monomer for polar resin, a copolymerization ratio of the methyl methacrylate is preferably 50.0% by mass or more and 99.9% by mass or less, and a copolymerization ratio of the polar group-containing (meth)acrylic monovinyl monomer is preferably 0.1% by mass or more and 5.0% by mass or less.

In the production method, the sparingly water-soluble inorganic metal salt as the dispersant is preferably magnesium hydroxide.

In the production method, the polymerizable monomer for shell preferably contains, in a total mass (100% by mass) of the polymerizable monomer for shell, a crosslinkable monomer in an amount of 70% by mass or more and 100% by mass or less and a non-crosslinkable monomer in an amount of 0% by mass or more and 30% by mass or less.

Advantageous Effects of Invention

According to the above-mentioned production method of the present disclosure, the hollow particles which have a high void ratio, which are less likely to collapse, which can reduce the residual amount of volatile compounds used in the production process, such as a non-reactive hydrocarbon solvent and an unreacted monomer, and especially which are less likely to collapse when mixed with other materials such as a resin, can be produced.

DESCRIPTION OF EMBODIMENTS

1. Method for Producing Hollow Particles

Figure 1:
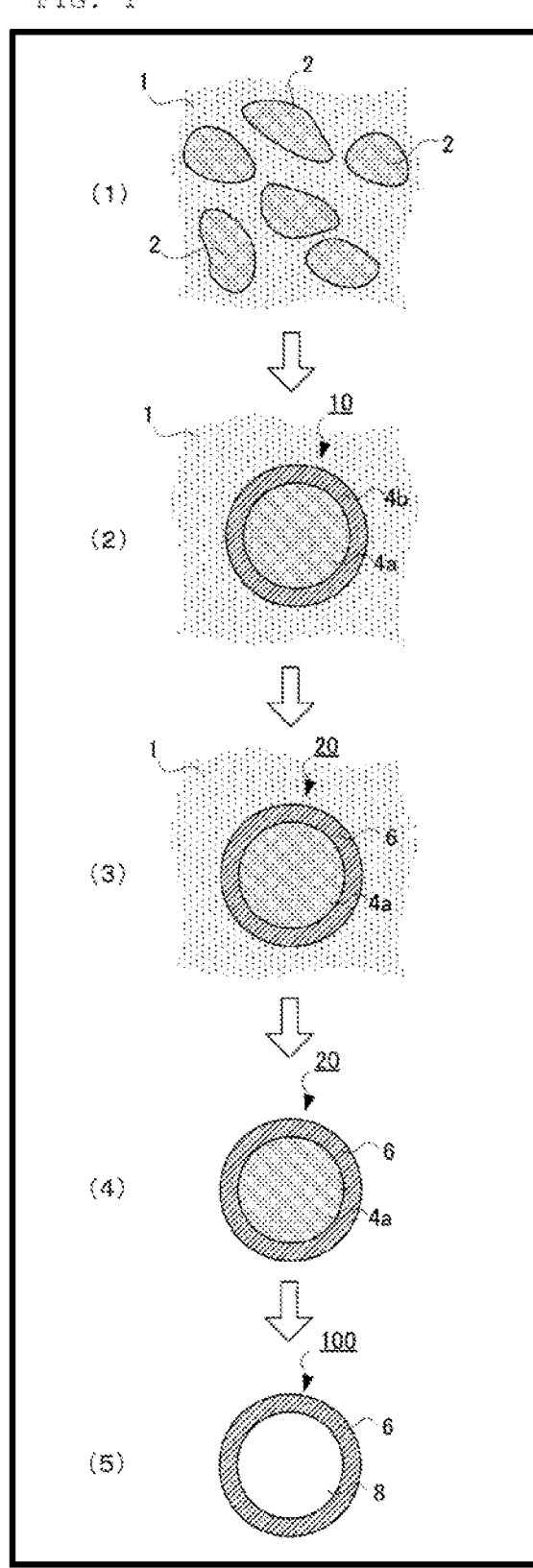
FIG. 1 is a diagram illustrating an example of the production method of the present disclosure.

The hollow particle production method of the present disclosure is a method for producing hollow particles which comprise a resin-containing shell and a hollow portion surrounded by the shell and which have a void ratio of 50% or more and 90% or less, the method comprising:

a suspension step comprising carrying out a suspension treatment of a mixture liquid containing a polymerizable monomer for shell, a polar resin selected from the group consisting of polymers containing a repeating unit which contains a heteroatom, a hydrocarbon solvent, a sparingly water-soluble inorganic metal salt as a dispersant, and an aqueous medium to prepare a suspension in which droplets of a monomer composition containing the polymerizable monomer for shell, the polar resin and the hydrocarbon solvent are dispersed in the aqueous medium, a polymerization step comprising subjecting the suspension to a polymerization reaction, and a hydrocarbon solvent removal step comprising removing the hydrocarbon solvent included in the hollow particles obtained by the polymerization step.

The hollow particles of the present disclosure are particles which comprise a resin-containing shell (outer shell) and a hollow portion surrounded by the shell.

In the present disclosure, the term "hollow portion" means a hollow space clearly distinguished from the shell of hollow particles formed from a resin material. The shell of the hollow particles may have a porous structure. In this case, the hollow portion has a size that can be clearly distinguished from many minute spaces uniformly dispersed in the porous structure.

The hollow portion of the hollow particles can be determined by, for example, SEM observation of a cross section of the particles or TEM observation of the particles as they are.

The hollow portion of the hollow particles may be filled with gas such as air, or it may contain a solvent.

In general, the shell of the hollow particles of the present disclosure does not have a communication hole and a shell defect, and the hollow portion is isolated from the outside of the particles by the shell. In general, there are hollow particles in which the shell does not have a communication hole communicating between the hollow portion and the external space of the particles, and hollow particles in which the shell has one or two or more communication holes and the hollow portion communicates with the outside of the particles via the communication holes. While the communication hole imparts beneficial functions to the hollow particles, since the communication hole is a defect portion of the shell, it decreases the strength of the hollow particles and causes the collapse of the hollow particles. In general, the hollow particles of the present disclosure do not have a communication hole having a diameter of 10 nm or more and 500 nm or less. In the present disclosure, the shell defect of the hollow particles means a crack-shaped defect which is extremely large relative to the size of the hollow particles, and it causes deterioration of the strength of the hollow particles. In general, depending on the size of the hollow particles, a crack having a length of 1 μm or more extremely deteriorates the strength of hollow particles. Accordingly, it is recognized as a shell defect.

In the present disclosure, the case where the shell does not have a communication hole and a shell defect encompasses the case where the shell does not substantially have a communication hole and a shell defect. If, as a result of SEM observation of 100 hollow particles, the number of hollow particles having a communication hole or a shell defect is 5 or less, the produced hollow particles are considered not to have a communication hole and a shell defect.

In the present disclosure, the method for producing the hollow particles follows the following basic technique: by carrying out the suspension treatment of the mixture liquid containing the polymerizable monomer for shell, the hydrocarbon solvent, the dispersant, and the aqueous medium, phase separation is caused between the polymerizable monomer for shell and the hydrocarbon solvent, and the suspension in which droplets are dispersed in the aqueous medium, and the droplets having a distribution structure such that the polymerizable monomer for shell is distributed on the surface side and the hydrocarbon solvent is distributed in the center, is prepared, and by subjecting the suspension to a polymerization reaction, the surface of the droplets is cured to form the hollow particles having the hollow portion filled with the hydrocarbon solvent.

In this basic technique, by using the sparingly water-soluble inorganic metal salt as the dispersant and adding the polar resin to the polymerizable monomer for shell, the hollow particles which are less likely to collapse even though they have a high void ratio and in which the residual amount of the volatile compounds such as the hydrocarbon solvent and the unreacted monomer is small, can be produced.

The reason why the above-mentioned effects are obtained by the hollow particle production method of the present disclosure, is presumed as follows.

The thickness of the shell (shell thickness) of the hollow particles is thought to have a large influence on the resistance to collapse of the hollow particles. As a result of comparing hollow particles having the same void ratio but different particle diameters to each other, the shell thickness increases as the particle diameter increases. Accordingly, the strength of the shell increases, and the hollow particles are less likely to collapse.

Meanwhile, the shell thickness of the hollow particles is thought to have a large influence on the efficiency of removal of the volatile compounds from the hollow particles. After the hollow particles are formed by polymerization of the droplets, it is needed to remove the volatile compounds such as the hydrocarbon solvent, which is used as a spacer material for forming the hollow portion, and the unreacted polymerizable monomer for shell from the hollow particles. However, when the shell thickness of the hollow particles is too large, it is difficult to remove the volatile compounds from the hollow particles.

From the viewpoint of the shell thickness, accordingly, it is important to control the diameter of the droplets containing the polymerizable monomer for shell and the hydrocarbon solvent, in order to obtain the hollow particles which are less likely to collapse even though they have a high void ratio, and in which the residual amount of volatile compounds is small.

The diameter of the droplets is influenced by the type of the dispersant used in the suspension.

For example, when a surfactant such as sodium dodecylbenzene sulfonate, which is used in the inventions of Patent Literatures 1 and 2, is used as the dispersant, droplets having a small diameter are formed. Accordingly, the particle diameter of the thus-obtained hollow particles become small, and the hollow particles are likely to collapse, even though they have a high void ratio.

When polyvinyl alcohol, which is used in the invention of Patent Literature 3, is used as the dispersant, droplets having a large diameter are formed. Accordingly, the particle diameter of the thus-obtained hollow particles become large, and the volatile compounds are difficult to be removed from the hollow particles, even though the hollow particles have a high void ratio.

The sparingly water-soluble inorganic metal salt can be used as a dispersant; however, droplets having a large diameter are produced when the sparingly water-soluble inorganic metal salt is used without a polar resin. Accordingly, the particle diameter of the thus-obtained hollow particles become large, and the volatile compounds are difficult to be removed from the hollow particles, even though the hollow particles have a high void ratio.

In the present disclosure, by using the combination of the sparingly water-soluble inorganic metal salt and the polar resin, the diameter of the droplets can be appropriately controlled. Accordingly, the hollow particles which are less likely to collapse even though they have a high void ratio, and in which the residual amount of volatile compounds is small, can be obtained.

In the suspension treatment of the mixture liquid containing the polymerizable monomer for shell, the polar resin, the hydrocarbon solvent, the sparingly water-soluble inorganic metal salt as a dispersant, and the aqueous medium, the monomer composition containing the polymerizable monomer for shell, the polar resin and the hydrocarbon solvent is formed into droplets by an action of the dispersant, and the suspension in which the droplets are dispersed in the aqueous medium, is obtained.

The droplets have the following structure: phase separation occurs between the hydrocarbon solvent and materials other than the hydrocarbon solvent, that is, materials including the polymerizable monomer for shell and the polar resin; the hydrocarbon solvent is distributed in the center; materials other than the hydrocarbon solvent is distributed on the surface side; especially, the polar resin is distributed in the vicinity of the surface; and the sparingly water-soluble inorganic metal salt attaches to the surface. Such a material distribution structure is formed according to differences in affinity for the aqueous medium between the materials.

In the present disclosure, the droplets in the suspension have the above-mentioned material distribution structure, and an interaction between the sparingly water-soluble inorganic metal salt and the polar resin occurs on the surface of the droplets. Accordingly, it is thought that the dispersibility of the droplets by the sparingly water-soluble inorganic metal salt is changed, and the diameter of the droplets containing the polymerizable monomer for shell and the hydrocarbon solvent can be appropriately controlled.

The hollow particles of the present disclosure are characterized in that the shell has very few communication holes and shell defects.

In general, there are hollow particles in which the shell does not have a communication hole communicating between the hollow portion and the external space of the particles, and hollow particles in which the shell has one or two or more communication holes and the hollow portion communicates with the outside of the particles via the communication holes. In general, depending on the size of the hollow particles, the diameter of the communication hole is approximately from 10 nm to 500 nm. While the communication hole imparts beneficial functions to the hollow particles, since the communication hole is a defect portion of the shell, it decreases the strength of the hollow particles and causes the collapse of the hollow particles.

Also, the hollow particles may have a crack-shaped shell defect which is extremely large relative to the size of the hollow particles. In general, depending on the size of the hollow particles, a crack having a length of 1 μm or more extremely deteriorates the strength of hollow particles. Accordingly, it is recognized as a shell defect.

In the present disclosure, it is thought that since an interaction between the sparingly water-soluble inorganic metal salt and the polar resin occurs on the surface of the droplets, the condition of the surface of the hollow particles is improved, and the shell having very few communication holes and shell defects can be formed.

The method described above basically includes the mixture liquid preparation step, the suspension step, the polymerization step and the hydrocarbon solvent removal step. The method may further include other steps. For example, solid-liquid separation may be performed after the polymerization step, and a solvent removal step may be performed in an air atmosphere for removal of the hydrocarbon solvent in the precursor particles.

As far as technically possible, two or more of the above steps and other additional steps may be simultaneously carried out as one step, or their order may be changed and then they may be carried out in that order. For example, the preparation and suspension of the mixture liquid may be simultaneously carried out in one step (e.g., the mixture liquid may be suspended while adding the materials for the mixture liquid).

A preferred embodiment of the production method of the present disclosure includes the following steps.

(1) Mixture Liquid Preparation Step

This step includes preparing a mixture liquid containing a polymerizable monomer for shell, a polar resin, a hydrocarbon solvent, a sparingly water-soluble inorganic metal salt as a dispersant, and an aqueous medium.

(2) Suspension Step

This step includes carrying out a suspension treatment of the mixture liquid to prepare a suspension in which droplets of a monomer composition containing the polymerizable monomer for shell, the polar resin and the hydrocarbon solvent are dispersed in the aqueous medium.

(3) Polymerization Step

This step includes subjecting the suspension to a polymerization reaction to prepare a precursor composition containing hollow particles (precursor particles) having a hollow portion and including the hydrocarbon solvent in the hollow portion.

(4) Solid-Liquid Separation Step

This step includes carrying out solid-liquid separation of the precursor composition to obtain the hollow particles (precursor particles).

(5) Solvent Removal Step

This step includes removing the hydrocarbon solvent included in the hollow particles (precursor particles) obtained by the solid-liquid separation step.

In the present disclosure, the hollow particles including the hydrocarbon solvent obtained by the polymerization step may be considered as the intermediate of the hollow particles in which the hollow portion is filled with gas, and they may be referred to as "precursor particles". Also in the present disclosure, the composition containing the precursor particles is referred to as a "precursor composition".

FIG. 1 is a schematic diagram showing an example of the production method of the present disclosure. The diagrams (1) to (5) in FIG. 1 correspond to the steps (1) to (5) described above, respectively. White arrows between the diagrams indicate the order of the steps. FIG. 1 is merely a schematic diagram for description, and the production method of the present disclosure is not limited to the method shown in FIG. 1. Further, the structures, dimensions and shapes of materials used for the production methods of the present disclosure are not limited to the structures, dimensions and shapes of various materials shown in these diagrams.

The diagram (1) of FIG. 1 is a schematic cross-sectional view showing an embodiment of the mixture liquid in the mixture liquid preparation step. As shown in the diagram, the mixture liquid contains an aqueous medium 1 and a low polarity material 2 dispersed in the aqueous medium 1. Here, the low polarity material 2 means a material that has low polarity and is less likely to mix with the aqueous medium 1. In the present disclosure, the low polarity material 2 contains the polymerizable monomer for shell, the polar resin and the hydrocarbon solvent.

The diagram (2) of FIG. 1 is a schematic cross-sectional view showing an embodiment of the suspension in the suspension preparation step. The suspension contains the aqueous medium 1 and a droplet 10 dispersed in the aqueous medium 1. The droplet 10 contains the polymerizable monomer for shell, the polar resin and the hydrocarbon solvent; however, their distribution in the droplet is not uniform. The droplet 10 has the following structure: phase separation occurs between the hydrocarbon solvent (hydrocarbon solvent 4a) and a material 4b which is other than the hydrocarbon solvent and which contains the polymerizable monomer for shell and the polar resin; the hydrocarbon solvent 4a is distributed in the center; the material 4b other than the hydrocarbon solvent is distributed on the surface side; the polar resin (not shown) is especially distributed in the vicinity of the surface; and a sparingly water-soluble inorganic metal salt (not shown) attaches to the surface.

The diagram (3) of FIG. 1 is a schematic cross-sectional view showing an embodiment of the precursor composition after the polymerization step. The precursor composition contains the aqueous medium 1 and a precursor particle 20 dispersed in the aqueous medium 1. A shell 6 forming the outer surface of the precursor particle 20 is formed by polymerization of monomers and so on contained in the droplet 10. The hollow portion in the interior of the shell 6 includes the hydrocarbon solvent 4a.

The diagram (4) of FIG. 1 is a schematic cross-sectional view showing an embodiment of the precursor particle after the solid-liquid separation step. The diagram (4) of FIG. 1 shows a state where the aqueous medium 1 is separated from the state shown in the diagram (3) of FIG. 1.

The diagram (5) of FIG. 1 is a schematic cross-sectional view showing an embodiment of the hollow particle after the solvent removal step. The diagram (5) of FIG. 1 shows a state where the hydrocarbon solvent 4a is removed from the state shown in the diagram (4) of FIG. 1.

As a result, a hollow particle 100 having a hollow portion 8 in the interior of the shell 6 is obtained.

Hereinbelow, the five steps mentioned above and other steps are described in order.

(1) Mixture Liquid Preparation Step

The present step includes preparing a mixture liquid containing a polymerizable monomer for shell, a polar resin, a hydrocarbon solvent, a sparingly water-soluble inorganic metal salt as a dispersant, and an aqueous medium.

The polymerizable monomer is a compound having a polymerizable functional group. In the present disclosure, at least one polymerizable monomer selected from the group consisting of a non-crosslinkable monomer and a crosslinkable monomer is used as the polymerizable monomer.

Also in the present disclosure, the polymerizable monomer for shell is a polymerizable monomer used for forming the shell of the hollow particles.

The non-crosslinkable monomer is a polymerizable monomer having only one polymerizable functional group. The crosslinkable monomer is a polymerizable monomer having two or more polymerizable functional groups and being able to form crosslinking in a resin by a polymerization reaction. As the polymerizable monomer, a compound having an ethylenically unsaturated bond as a polymerizable functional group, is generally used.

The mixture liquid may further contain other materials such as an oil-soluble polymerization initiator and a suspension stabilizer. The materials for the mixture liquid will be described in the order of (A) the polymerizable monomer for shell, (B) the polar resin, (C) the oil-soluble polymerization initiator, (D) the hydrocarbon solvent, (E) the dispersant and (F) the aqueous medium.

(A) Polymerizable Monomer for Shell

[Non-Crosslinkable Monomer]

As the non-crosslinkable monomer, a monovinyl monomer is preferably used. The monovinyl monomer is a compound having one polymerizable vinyl functional group.

As the monovinyl monomer, examples include, but are not limited to, a (meth)acrylic monovinyl monomer such as methyl (meth)acrylate, ethyl (meth)acrylate, butyl (meth)acrylate, 2-ethylhexyl (meth)acrylate, lauryl (meth)acrylate, glycidyl (meth)acrylate and 2-hydroxyethyl (meth)acrylate; an aromatic vinyl monomer such as styrene, vinyltoluene, α-methylstyrene, p-methylstyrene and halogenated styrene; a monoolefin monomer such as ethylene, propylene and butylene; a (meth)acrylamide monomer such as (meth) acrylamide, N-methylol (meth)acrylamide and N-butoxymethyl (meth)acrylamide, and derivatives thereof; a diene monomer such as butadiene and isoprene; a carboxylic acid vinyl ester monomer such as vinyl acetate; a vinyl halide monomer such as vinyl chloride; a vinylidene halide monomer such as vinylidene chloride; and a vinylpyridine monomer.

The monovinyl monomer is preferably a (meth)acrylic monovinyl monomer, and more preferably at least one selected from butyl acrylate and methyl methacrylate, from the point of view that the polymerization reaction can be easily stable and hollow particles with high heat resistance can be obtained.

In the present disclosure, (meth)acrylate means each of acrylate and methacrylate, and (meth)acryl means each of acryl and methacryl.

These non-crosslinkable monomers may be used alone or in combination of two or more.

[Crosslinkable Monomer]

In the present disclosure, the mechanical characteristics of the shell of the obtained hollow particles can be enhanced by using the crosslinkable monomer in combination with the non-crosslinkable monomer. Further, since the crosslinkable monomer has a plurality of polymerizable functional groups, monomers can be linked together, and the crosslinking density of the shell can be enhanced. Examples of the crosslinkable monomer include a bifunctional crosslinkable monomer such as divinylbenzene, divinyldiphenyl, divinylnaphthalene, diallyl phthalate, allyl (meth)acrylate, ethylene glycol di(meth)acrylate and pentaerythritol di(meth) acrylate, and a trifunctional or higher-functional crosslinkable monomer such as trimethylolpropane tri(meth) acrylate, ditrimethylolpropane tetra(meth)acrylate, pentaerythritol tri(meth)acrylate, pentaerythritol tetra(meth) acrylate and dipentaerythritol hexa(meth)acrylate. Among them, divinylbenzene, ethylene glycol di(meth)acrylate and pentaerythritol di(meth)acrylate are preferred, and ethylene glycol di(meth)acrylate and pentaerythritol di(meth)acrylate are more preferred.

These crosslinkable monomers may be used alone or in combination of two or more.

The content of the polymerizable monomer for shell (all of the non-crosslinkable monomer and the crosslinkable monomer) in the mixture liquid is not particularly limited. From the viewpoint of the void ratio of the hollow particles, a balance between the particle diameter and the mechanical strength, and reduction of the residual amount of the volatile compound, with respect to the total mass (100% by mass) of the components (except for the aqueous medium) in the mixture liquid, the content of the polymerizable monomer for shell is generally from 15% by mass to 55% by mass, and more preferably from 25% by mass to 40% by mass.

In the present disclosure, the amount of the crosslinkable monomer and that of the non-crosslinkable monomer in 100% by mass of the polymerizable monomer for shell, is as follows: the crosslinkable monomer is in an amount of 70% by mass or more and 100% by mass or less, and the non-crosslinkable monomer is in an amount of 0% by mass or more and 30% by mass or less. Since the amount of the crosslinkable monomer is 70% by mass or more, the content of the crosslinkable monomer unit in the shell of the hollow particles is large enough. Accordingly, the covalent bond network is more tightly strung in the shell. As a result, the hollow particles are excellent in strength, less likely to collapse, and less likely to deform even with respect to heat or the like applied from the outside. When the non-crosslinkable monomer is contained in an amount of 30% by mass or less, the generation of the communication hole of the shell and the shell defect is more likely to be suppressed. When the polymerizable monomer for shell contains the non-crosslinkable monomer, the amounts of the crosslinkable monomer and non-crosslinkable monomer contained in 100% by mass of the polymerizable monomer for shell, are not particularly limited. For example, the crosslinkable monomer may be 70% by mass and 95% by mass or less and the non-crosslinkable monomer may be 5% by mass or more and 30% by mass or less, or the crosslinkable monomer may be 70% by mass or more and 90% by mass or less and the non-crosslinkable monomer may be 10% by mass or more and 30% by mass or less.

(B) Polar Resin (2) Polar Resin

The shell of the hollow particles of the present disclosure further contains the polar resin.

In the present disclosure, the polar resin means the polymer containing a repeating unit which contains a heteroatom. As the polar polymer, examples include, but are not limited to, an acrylic resin, a polyester resin, and a vinyl resin containing a heteroatom.

The polar resin may be a homopolymer or copolymer of a heteroatom-containing monomer, or it may be a copolymer of a heteroatom-containing monomer and a heteroatom-free monomer. When the polar resin is a copolymer of a heteroatom-containing monomer and a heteroatom-free monomer, from the viewpoint of easily controlling the particle diameter of the hollow particles, in 100% by mass of all the repeating units constituting the copolymer, the amount of the heteroatom-containing monomer unit is preferably 50% by mass or more, more preferably 70% by mass or more, and still more preferably 90% by mass or more.

As the heteroatom-containing monomer for the polar resin, examples include, but are not limited to, a (meth) acrylic monovinyl monomer which is a monomer containing a (meth)acryloyl group, such as methyl (meth)acrylate, ethyl (meth)acrylate, butyl (meth)acrylate, 2-ethylhexyl (meth) acrylate, lauryl (meth)acrylate, acrylic acid, methacrylic acid, 2-hydroxyethyl (meth)acrylate, 2-hydroxypropyl (meth)acrylate, 4-hydroxybutyl (meth)acrylate, methoxypolyethylene glycol (meth)acrylate, dimethylaminoethyl (meth)acrylate, diethylaminoethyl (meth)acrylate, glycidyl (meth)acrylate, and 4-hydroxybutyl acrylate glycidyl ether; an aromatic vinyl monomer containing a heteroatom, such as halogenated styrene and styrene sulfonate; a carboxylic acid vinyl ester monomer such as vinyl acetate; a vinyl halide monomer such as vinyl chloride; a vinylidene halide monomer such as vinylidene chloride; a vinylpyridine monomer; a carboxyl group-containing monomer such as an ethylenically unsaturated carboxylic acid monomer such as crotonic acid, cinnamic acid, itaconic acid, fumaric acid, maleic acid and butene tricarboxylic acid; and an epoxy group-containing monomer such as allyl glycidyl ether. These heteroatom-containing monomers may be used alone or in combination of two or more.

As the heteroatom-free monomer for the polar resin, examples include, but are not limited to, an aromatic vinyl monomer not containing a heteroatom, such as styrene, vinyltoluene, α-methylstyrene and p-methylstyrene; a monoolefin monomer such as ethylene, propylene and butylene; and a diene monomer such as butadiene and isoprene. These heteroatom-free monomers may be used alone or in combination of two or more.

From the viewpoint of high compatibility with the polymerizable monomer for shell and easily controlling the particle diameter of the hollow particles, the polar resin is preferably an acrylic resin. In the acrylic resin, with respect to 100% by mass of all the repeating units constituting the resin, the total mass of the (meth)acrylic monovinyl monomer unit is preferably 50% by mass or more, more preferably 70% by mass or more, and still more preferably 90% by mass or more. The polar resin is particularly preferably an acrylic resin such that all the repeating units constituting the resin are composed of the (meth)acrylic monovinyl monomer unit.

In the polar resin, from the viewpoint of easily controlling the particle diameter of the hollow particles, it is particularly preferable that the heteroatom-containing monomer contains a polar group-containing monomer unit that contains a polar group selected from a carboxyl group, a hydroxyl group, a sulfonic acid group, an amino group, a polyoxyethylene group and an epoxy group. Of them, preferred polar groups are a carboxyl group and a hydroxyl group, from the point of view that the particle diameter can be controlled by adding a small amount thereof.

As the polar group-containing monomer, examples include, but are not limited to, a carboxyl group-containing monomer such as an ethylenically unsaturated carboxylic acid monomer such as acrylic acid, methacrylic acid, crotonic acid, cinnamic acid, itaconic acid, fumaric acid, maleic acid and butene tricarboxylic acid; a hydroxyl group-containing monomer such as 2-hydroxyethyl (meth)acrylate, 2-hydroxypropyl (meth)acrylate and 4-hydroxybutyl (meth) acrylate; a sulfonic acid group-containing monomer such as styrenesulfonic acid; an amino group-containing monomer such as dimethylaminoethyl (meth)acrylate and diethylaminoethyl (meth)acrylate; a polyoxyethylene group-containing monomer such as methoxypolyethylene glycol (meth)acrylate; and an epoxy group-containing monomer such as glycidyl (meth)acrylate, allyl glycidyl ether and 4-hydroxybutyl acrylate glycidyl ether. These polar group-containing monomers may be used alone or in combination of two or more.

When the polar resin contains the polar group-containing monomer unit, it is preferable that the polar group is present in at the end of the main chain or that of a side chain, or the polar group is bound to the main chain or a side chain in a pendant form, from the point of view that the polar resin can be easily disposed on the outer surface of the hollow particles and that the particle diameter of the hollow particles can be easily controlled.

When the polar resin does not contain the polar group-containing monomer unit, from the viewpoint of high compatibility with the polymerizable monomer for shell and easily controlling the particle diameter of the hollow particles, the polar resin preferably contains a monomer unit derived from alkyl (meth)acrylate as the heteroatom-containing monomer unit. Especially from the viewpoint of high polarity, the polar resin preferably contains a monomer unit derived from alkyl (meth)acrylate in which the alkyl group has 3 or less carbon atoms, more preferably a monomer unit derived from alkyl (meth)acrylate in which the alkyl group is a methyl group or an ethyl group, and still more preferably a monomer unit derived from alkyl (meth)acrylate in which the alkyl group is a methyl group.

From the viewpoint of high compatibility with the polymerizable monomer for shell and easily controlling the particle diameter of the hollow particles, the acrylic resin as the polar resin is preferably a polymer or copolymer of polymerizable monomers for polar resin, which include 50% by mass or more of methyl methacrylate with respect to the total mass (100% by mass) of the polymerizable monomer for polar resin. In the present disclosure, the polymerizable monomer used for synthesis of the polar resin is referred to as the "polymerizable monomer for polar resin".

From the viewpoint of easily controlling the particle diameter of the hollow particles, the acrylic resin as the polar resin is more preferably a copolymer of polymerizable monomers for polar resin, which include 50.0% by mass or more and 99.9% by mass or less of methyl methacrylate and 0.1% by mass or more and 5.0% by mass or less of the polar group-containing monomer, still more preferably a copolymer of polymerizable monomers for polar resin, which include 50.0% by mass or more and 99.0% by mass or less of methyl methacrylate and 0.1% by mass or more and 5.0% by mass or less of the polar group-containing monomer, even more preferably a copolymer of polymerizable monomers for polar resin, which include 50.0% by mass or more and 99.0% by mass or less of methyl methacrylate, 1.0% by mass or more and 5.0% by mass or less of a (meth)acrylic monovinyl monomer being unlike methyl methacrylate and not containing the polar group, and 0.1% by mass or more and 5.0% by mass or less of the polar group-containing monomer, and particularly preferably a copolymer of polymerizable monomers for polar resin, which include 50.0% by mass or more and 98.0% by mass or less of methyl methacrylate, 1.0% by mass or more 5.0% by mass or less of a (meth)acrylic monovinyl monomer being unlike methyl methacrylate and not containing the polar group, and 0.2% by mass or more and 3.0% by mass or less of the polar group-containing monomer.

As the (meth)acrylic monovinyl monomer which is unlike methyl methacrylate and which does not contain the polar group, at least one selected from ethyl acrylate and butyl acrylate is preferred, and ethyl acrylate is particularly preferred, from the point of view that glass transition temperature can be controlled.

As the polar group-containing monomer, a (meth)acrylic monovinyl monomer containing the polar group is preferred from the viewpoint of compatibility with the polymerizable monomer for shell, and a (meth)acrylic monovinyl monomer containing a carboxyl group or hydroxyl group is more preferred from the point of view that the particle diameter can be controlled by adding a small amount thereof.

The polar resin can be obtained by, for example, polymerizing polymerizable monomers for polar resin, which include the heteroatom-containing monomer, by a polymerization method such as solution polymerization and emulsion polymerization.

When the polar resin is a copolymer, the copolymer may be any one of a random copolymer, a block copolymer and a graft copolymer. The polar resin is preferably a random copolymer.

From the viewpoint of increasing the solubility, the polar resin is preferably finely pulverized.

The number average molecular weight (Mn) of the polar resin is not particularly limited; however, the polystyrene equivalent number average molecular weight (Mn) of the polar resin measured by gel permeation chromatography (GPC) using tetrahydrofuran is preferably in a range of 3000 or more and 20000 or less, more preferably in a range of 4000 or more and 17000 or less, and still more preferably in a range of 6000 or more and 15000 or less. When the number average molecular weight (Mn) of the polar resin is equal to or more than the lower limit, the solubility of the polar resin is increased, and the particle diameter of the hollow particles can be easily controlled. When the number average molecular weight of the polar resin is equal to or less than the upper limit, a decrease in the strength of the shell can be suppressed.

In the hollow particles of the present disclosure, the content of the polar resin is preferably 0.1 parts by mass or more and 10 parts by mass or less, more preferably 0.3 parts by mass or more and 8.0 parts by mass or less, and still more preferably 0.5 parts by mass or more and 8.0 parts by mass or less, with respect to 100 parts by mass of the polymerizable monomer for shell. When the content of the polar resin is equal to or more than the lower limit, the particle diameter of the hollow particles and the thickness of the shell can be easily controlled. Accordingly, the strength of the hollow particles can be increased, and the amount of the volatile compounds can be reduced. On the other hand, since the content of the polar resin is equal to or less than the upper limit, a decrease in the content of a polymer derived from the polymerizable monomer for shell, can be suppressed. Accordingly, a decrease in the strength of the shell can be suppressed, and a collapse of the hollow particles can be further suppressed.

(C) Oil-Soluble Polymerization Initiator

In the present disclosure, the mixture liquid preferably contains an oil-soluble polymerization initiator. As the method for polymerizing the droplets of the monomer composition after suspending the mixture liquid, examples include an emulsion polymerization method using a water-soluble polymerization initiator and a suspension polymerization method using an oil-soluble polymerization initiator. By using the oil-soluble polymerization initiator, suspension polymerization can be performed.

The oil-soluble polymerization initiator is not particularly limited, as long as it is a lipophilic one having a solubility in water of 0.2% by mass or less. Examples of the oil-soluble polymerization initiator include benzoyl peroxide, lauroyl peroxide, t-butyl peroxide 2-ethylhexanoate, 2,2'-azobis(2, 4-dimethylvaleronitrile) and azobis(isobutyronitrile).

When the total mass of the polymerizable monomer for shell in the mixture liquid is regarded as 100 parts by mass, the content of the oil-soluble polymerization initiator is preferably from 0.1 parts by mass to 10 parts by mass, more preferably from 0.5 parts by mass to 7 parts by mass, and still more preferably from 1 part by mass to 5 parts by mass. When the content of the oil-soluble polymerization initiator is from 0.1 parts by mass to 10 parts by mass, a polymerization reaction can progress sufficiently; the oil-soluble polymerization initiator is less likely to be left after the end of the polymerization reaction; and an unexpected side reaction is less likely to progress.

(D) Hydrocarbon Solvent

In the present disclosure, the hydrocarbon solvent is used as a non-polymerizable, sparingly water-soluble organic solvent. The hydrocarbon solvent serves as a spacer material for forming the hollow portion in the interior of the particles. In the suspension step described later, the suspension in which the droplets of the monomer composition containing the hydrocarbon solvent are dispersed in the aqueous medium, is obtained. In the suspension step, phase separation occurs in the droplets of the monomer composition. As a result, the hydrocarbon solvent with low polarity is likely to collect in the interior of the droplets of the polymerizable monomer. In the end, according to their respective polarities, the hydrocarbon solvent is distributed in the interior of the droplets of the monomer composition, and materials other than the hydrocarbon solvent are distributed at the periphery of the droplets of the monomer composition.

Then, in the polymerization step described later, the precursor composition containing the precursor particles including the hydrocarbon solvent, is obtained. That is, since the hydrocarbon solvent collects in the interior of the particles, the hollow portion filled with the hydrocarbon solvent is formed in the interior of the obtained precursor particles.

The type of the hydrocarbon solvent is not particularly limited. Examples of the hydrocarbon solvent include a saturated hydrocarbon solvent such as butane, pentane, n-hexane, cyclohexane, heptane and octane, an aromatic hydrocarbon solvent such as benzene, toluene and xylene, and a solvent with relatively high volatility such as carbon disulfide and carbon tetrachloride.

The void ratio of the hollow particles can be controlled by changing the amount of the hydrocarbon solvent in the mixture liquid. In the suspension step described later, the polymerization reaction progresses while oil droplets containing the crosslinkable monomer and so on include the hydrocarbon solvent. Accordingly, as the content of the hydrocarbon solvent increases, the void ratio of the obtained hollow particles tends to increase.

In the hydrocarbon solvent, the amount of the saturated hydrocarbon solvent is preferably 50% by mass or more, with respect to the total amount (100% by mass) of the hydrocarbon solvent. Accordingly, sufficient phase separation occurs in the droplets of the polymerizable monomer. As a result, hollow particles having only one hollow portion can be easily obtained, and the production of porous particles can be suppressed. The amount of the saturated hydrocarbon solvent is preferably 60% by mass or more, and more preferably 80% by mass or more, from the point of view that the production of porous particles is further suppressed, and that the hollow portions of the hollow particles are likely to be uniform. The hydrocarbon solvent is preferably a hydrocarbon solvent having 4 to 7 carbon atoms. A hydrocarbon compound having 4 to 7 carbon atoms can be easily included in the precursor particles in the polymerization step and can be easily removed from the precursor particles in the solvent removal step. A hydrocarbon solvent having 5 or 6 carbon atoms is particularly preferred.

From the viewpoint of ease of removal in the solvent removal step described later, the hydrocarbon solvent is preferably a hydrocarbon solvent having a boiling point of 130° C. or less, and more preferably a hydrocarbon solvent having a boiling point of 100° C. or less. The hydrocarbon solvent is preferably a hydrocarbon solvent having a boiling point of 50° C. or more, and more preferably a hydrocarbon solvent having a boiling point of 60° C. or more, from the point of view that the hydrocarbon solvent can be easily included in the precursor particles.

The relative permittivity at 20° C. of the hydrocarbon solvent is preferably 3 or less. The relative permittivity is an index of the level of the polarity of a compound. In the case where the relative permittivity of the hydrocarbon solvent is 3 or less and sufficiently small, it is presumed that phase separation progresses rapidly in the droplets of the polymerizable monomer and a hollow is easily formed.

Examples of solvents having a relative permittivity at 20° C. of 3 or less, are as follows. The inside of the parentheses is the value of relative permittivity.

Heptane (1.9), cyclohexane (2.0), benzene (2.3), and toluene (2.4).

For the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method of measuring the relative permittivity at 20° C. include a relative permittivity test that is in conformity with 23 of JIS C 2101:1999 and is performed with the measuring temperature set to 20° C.

In the present disclosure, with respect to the total mass (100 parts by mass) of the polymerizable monomer for shell, the content of the hydrocarbon solvent in the mixture liquid is preferably 50 parts by mass or more and 500 parts by mass or less, from the following viewpoints: the particle diameter of the hollow particles is easily controlled; the void ratio is easily increased while maintaining the strength of the hollow particles; and the amount of the hydrocarbon solvent remaining in the particles is easily reduced. With respect to the total mass (100 parts by mass) of the polymerizable monomer for shell, the content of the hydrocarbon solvent in the mixture liquid is preferably 60 parts by mass or more and 400 parts by mass or less, more preferably 70 parts by mass or more and 300 parts by mass or less, and still more preferably 80 parts by mass or more and 200 parts by mass or less.

(E) Dispersant

The dispersant is an agent for dispersing droplets of the monomer composition in the aqueous medium in the suspension step. In the present disclosure, a sparingly water-soluble inorganic metal salt is used as the dispersant. By use of the sparingly water-soluble inorganic metal salt, droplets having a large diameter can be formed in the suspension. Accordingly, the thickness of the shell is increased after polymerization, and the hollow particles are less likely to collapse.

As the sparingly water-soluble inorganic metal salt, examples include, but are not limited to, magnesium hydroxide, calcium hydroxide, barium hydroxide and calcium phosphate. These sparingly water-soluble inorganic metal salts may be used alone or in combination of two or more.

Of these sparingly water-soluble inorganic metal salts, magnesium hydroxide can be preferably used from the point of view that the diameter of the droplets can be easily controlled in the suspension, and that the particle size distribution of the hollow particles thus obtained can be sharp.

In the present disclosure, the sparingly water-soluble inorganic metal salt is preferably an inorganic metal salt such that the solubility in 100 g of water is 0.5 g or less.

When the total mass of the polymerizable monomer for shell and the hydrocarbon solvent is 100 parts by mass, the content of the dispersant is preferably from 0.5 parts by mass to 10 parts by mass, and more preferably from 1.0 part by mass to 8.0 parts by mass. Since the content of the dispersant is 0.5 parts by mass or more, the droplets of the monomer composition can be sufficiently dispersed in the suspension so that they do not join together. On the other hand, since the content of the dispersant is 10 parts by mass or less, an increase in the viscosity of the suspension is prevented in the formation of the droplets, and a problem such that the suspension cannot pass through a droplet forming machine, can be avoided.

With respect to 100 parts by mass of the aqueous medium, the content of the dispersant is generally 2 parts by mass or more and 15 parts by mass or less. For the same reason as above, it is more preferably 3 parts by mass or more and 8 parts by mass or less.

(F) Aqueous Medium

In the present disclosure, the term "aqueous medium" means a medium selected from the group consisting of water, a hydrophilic solvent and a mixture of water and a hydrophilic solvent.

The hydrophilic solvent in the present disclosure is not particularly limited, as long as it is one that mixes with water sufficiently and does not develop phase separation. Examples of the hydrophilic solvent include alcohols such as methanol and ethanol; tetrahydrofuran (THF); and dimethyl sulfoxide (DMSO).

Among the aqueous media, water is preferably used in terms of its high polarity. When a mixture of water and a hydrophilic solvent is used, from the viewpoint of forming the droplets of the monomer composition, it is important that the polarity of the entire mixture is not too low. In this case, for example, the mixing ratio (mass ratio) between water and the hydrophilic solvent may be set to water:hydrophilic solvent=99:1 to 50:50.

The mixture liquid is obtained by mixing the above-mentioned materials and other materials as needed, appropriately stirring the mixture, etc. In the mixture liquid, an oil phase containing the lipophilic materials such as (A) the polymerizable monomer for shell, (B) the polar resin, (C) the oil-soluble polymerization initiator and (D) the hydrocarbon solvent, is dispersed with a size of a particle diameter of approximately several millimeters in an aqueous phase containing (E) the dispersant, (F) the aqueous medium, etc. The dispersion state of these materials in the mixture liquid can be observed with the naked eye, depending on the types of the materials.

In the mixture liquid preparation step, the mixture liquid may be obtained by simply mixing the above-mentioned materials and other materials as needed, appropriately stirring the mixture, etc. From the point of view that the shell can be easily uniform, it is preferable to prepare the mixture liquid by separately preparing the oil phase containing the polymerizable monomer for shell, the polar resin and the hydrocarbon solvent and the aqueous phase containing the dispersant and the aqueous medium in advance, and then mixing the phases together. As just described, by separately preparing the oil phase and the aqueous phase in advance and then mixing them, hollow particles such that the composition of the shell portion is uniform, can be produced.

(2) Suspension Step

The suspension step includes carrying out a suspension treatment of the mixture liquid to prepare a suspension in which the droplets of the monomer composition containing the hydrocarbon solvent are dispersed in the aqueous medium.

The suspension method for forming the droplets of the monomer composition is not particularly limited. For example, it is performed using an apparatus capable of performing strong stirring, such as an in-line type emulsifying disperser (manufactured by Pacific Machinery & Engineering Co., Ltd.; product name: MILDER) or a high-speed emulsifying disperser (manufactured by PRIMIX Corporation; product name: T. K. HOMOMIXER MARK II Type).

In the suspension prepared in the suspension step, the droplets of the monomer composition containing the lipophilic materials mentioned above and having a particle diameter of approximately from 4.0 μm to 13.0 μm, are dispersed uniformly in the aqueous medium. Such droplets of the monomer composition are difficult to be observed with the naked eye and can be observed with known observation equipment such as an optical microscope.

In the suspension step, since phase separation occurs in the droplets of the monomer composition, the hydrocarbon solvent with low polarity is likely to collect in the interior of the droplets. As a result, in the obtained droplets, the hydrocarbon solvent is distributed in the interior thereof, and the materials other than the hydrocarbon solvent are distributed at the periphery thereof.

As described above, not the emulsion polymerization method but the suspension polymerization method is employed in the present disclosure. Hereinbelow, an advantage of using the suspension polymerization method and the oil-soluble polymerization initiator is described with contrast the emulsion polymerization method.

Figure 3:
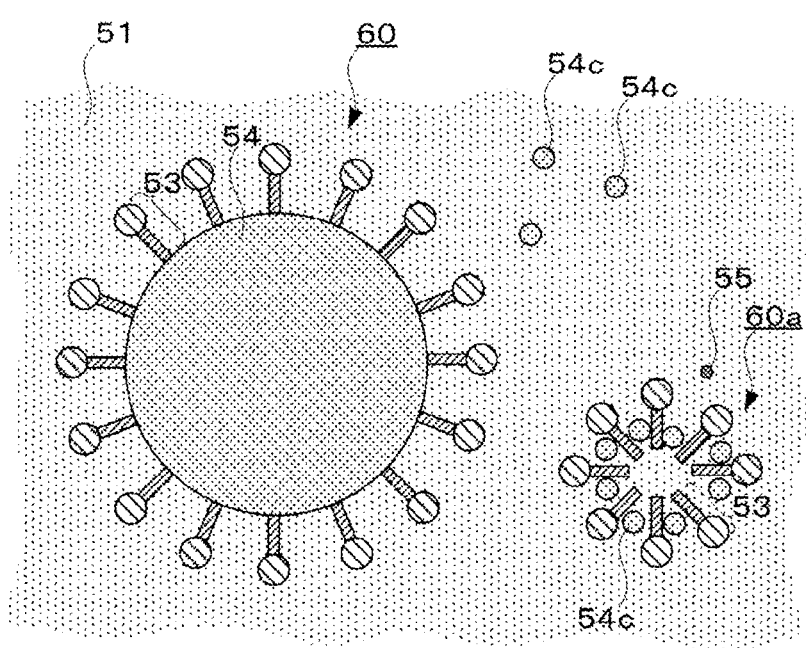
FIG. 3 is a schematic diagram showing a dispersion for conventional emulsion polymerization.

FIG. 3 is a schematic diagram showing a dispersion for emulsion polymerization. A micelle 60 in FIG. 3 schematically shows a cross section thereof.

FIG. 3 shows a situation where the micelle 60, a micelle precursor 60a, a monomer 54c dissolved out in a solvent, and a water-soluble polymerization initiator 55 are dispersed in an aqueous medium 51. The micelle 60 is formed by an oil-soluble monomer composition 54 and a surfactant 53 surrounding the periphery of the oil-soluble monomer composition 54. The monomer composition 54 contains a monomer serving as a raw material for a polymer, etc. However, it does not contain a polymerization initiator.

The micelle precursor 60a is an aggregate of the surfactant 53; however, it does not contain a sufficient amount of the monomer composition 54 in the interior. The micelle precursor 60a incorporates the monomer 54c dissolved out in the solvent into the interior of the micelle precursor, and procures a part of the monomer composition 54 from other micelles 60. Thereby, it grows into the micelle 60.

The water-soluble polymerization initiator 55 enters the interiors of the micelle 60 and the micelle precursor 60a while being diffused in the aqueous medium 51, and promotes the growth of oil droplets in the interiors thereof. Therefore, in the emulsion polymerization method, although the micelles 60 are monodispersed in the aqueous medium 51, it is predicted that the particle diameter of the micelles 60 will grow up to several hundred nanometers (nm).

Figure 2:
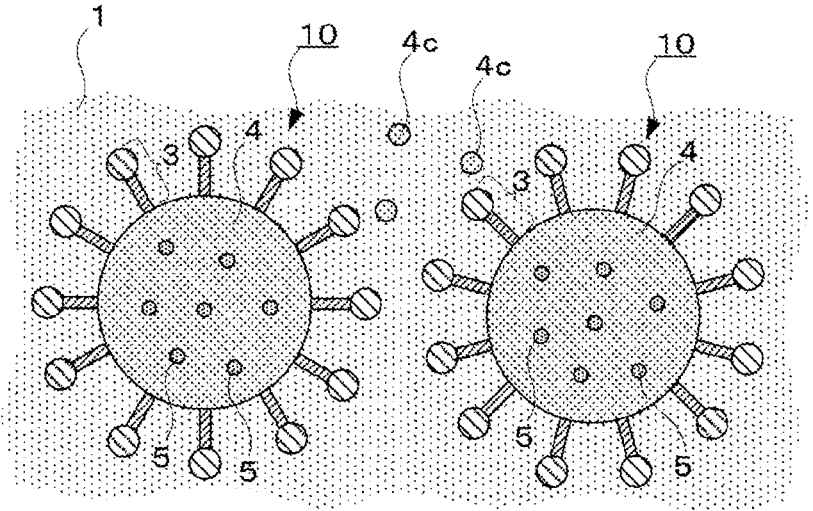
FIG. 2 is a schematic diagram showing an embodiment of a suspension in a suspension step.

FIG. 2 is a schematic diagram showing an embodiment of the suspension in the suspension step. Each droplet 10 of the monomer composition in FIG. 2 schematically shows a cross section thereof. FIG. 2 is merely a schematic diagram, and the suspension in the present disclosure is not limited to that shown in FIG. 2. A part of FIG. 2 corresponds to the diagram (2) of FIG. 1 described above.

FIG. 2 shows a situation where the droplets 10 of the monomer composition and a polymerizable monomer 4c (including the non-crosslinkable monomer and the crosslinkable monomer) dispersed in the aqueous medium 1, are dispersed in the aqueous medium 1. Each droplet 10 is formed by the oil-soluble monomer composition 4 and a dispersant 3 surrounding the periphery of the oil-soluble monomer composition 4. The monomer composition contains the oil-soluble polymerization initiator 5, the polymerizable monomer (including the non-crosslinkable monomer and the crosslinkable monomer), the polar resin and the hydrocarbon solvent (none of them is illustrated).

Each droplet 10 is a minute oil droplet which contains the monomer composition 4, and the oil-soluble polymerization initiator 5 generates polymerization initiating radicals in the interior of the minute oil droplet. Therefore, the precursor particles with a target particle diameter can be produced without excessively growing the minute oil droplet.

Further, as can be seen by comparing the suspension polymerization (FIG. 2) and the emulsion polymerization (FIG. 3), the suspension polymerization (FIG. 2) does not provide an opportunity for the oil-soluble polymerization initiator 5 to come into contact with the polymerizable monomer 4c dispersed in the aqueous medium 1. Thus, the generation of surplus polymer particles (e.g., solid particles having a relatively small particle diameter) in addition to the target resin particles having the hollow portion, can be suppressed by using the oil-soluble polymerization initiator.

In the production method of the present disclosure, by use of the sparingly water-soluble inorganic metal salt as the dispersant 3, minute oil droplets having large diameter compared to the case of using other dispersants, can be formed in the suspension. Accordingly, the thickness of the shell is increased after polymerization, and hollow particles which are less likely to collapse, can be obtained.

Also in the production method of the present disclosure, since the monomer composition 4 contains the polar resin, the diameter of the minute oil droplets can be easily controlled. Accordingly, an excess increase in the thickness of the shell after polymerization, can be suppressed, and the residual amount of the volatile compounds can be decreased.

(3) Polymerization Step

The present step includes subjecting the suspension to a polymerization reaction to prepare the precursor composition containing the precursor particles having the hollow portion and including the hydrocarbon solvent in the hollow portion.

In the polymerization step, the polymerizable monomer for shell in the droplets is polymerized while the droplets of the monomer composition include the hydrocarbon solvent. Accordingly, the precursor particles are formed, which are composed of the shell containing a resin (a polymer obtained by polymerization of the polymerizable monomer for shell) and the hollow portion filled with the hydrocarbon solvent.

In the production method of the present disclosure, the droplets of the monomer composition are subjected to a polymerization reaction while the hydrocarbon solvent is included in them. Accordingly, the polymerization reaction is likely to progress while the shape of the droplets is retained, and the size and void ratio of the precursor particles can be easily controlled. Since the polymerizable monomer for shell and the hydrocarbon solvent are used together, the polarity of the hydrocarbon solvent is low with respect to the shell of the precursor particles, and the hydrocarbon solvent is not easily compatible with the shell. Accordingly, sufficient phase separation occurs and only one hollow portion is likely to be formed. Also, the size and void ratio of the precursor particles can be easily controlled by controlling the amount of the hydrocarbon solvent, the amount of the polar resin, the type of the dispersant, and so on.

The polymerization system is not particularly limited. For example, a batch system, a semicontinuous system or a continuous system may be employed. The polymerization temperature is preferably from 40° C. to 80° C., and more preferably from 50° C. to 70° C. The polymerization reaction time is preferably from 1 hour to 20 hours, and more preferably from 2 hours to 15 hours.

(4) Solid-Liquid Separation Step

The present step includes carrying out solid-liquid separation of the precursor composition to obtain a solid component containing the precursor particles including the hydrocarbon solvent.

The method of performing solid-liquid separation of the precursor composition is not particularly limited, and a known method may be used. Examples of the solid-liquid separation method include a centrifugation method, a filtration method, and still-standing separation. Among them, a centrifugation method or a filtration method may be employed, and from the viewpoint of simplicity of the operation, a centrifugation method may be employed.

Any step such as a preliminary drying step may be performed at a time after the solid-liquid separation step and before performing the solvent removal step described later. Examples of the preliminary drying step include performing preliminary drying on the solid component obtained after the solid-liquid separation step, with a drying apparatus such as a dryer or a drying appliance such as a hand dryer.

(5) Solvent Removal Step

The present step includes removing the hydrocarbon solvent included in the hollow particles (precursor particles) obtained by the solid-liquid separation step.

By removing the hydrocarbon solvent included in the precursor particles in a gaseous atmosphere, the hydrocarbon solvent in the interior of the precursor particles is replaced with air, and the hollow particles filled with gas are obtained.

In the present step, the term "in a gaseous atmosphere" includes "in an environment where no liquid components exist in the outside of the precursor particles" and "in an environment where only a very small amount of liquid components at a level that does not influence the removal of the hydrocarbon solvent exist in the outside of the precursor particles" in a strict sense. The term "in a gaseous atmosphere" can be reworded as a state where the precursor particles do not exist in a slurry, or it can be reworded as a state where the precursor particles exist in a dry powder. That is, in the present step, it is important to remove the hydrocarbon solvent in an environment where the precursor particles come into direct contact with the outside gas.

The method of removing the hydrocarbon solvent in the precursor particles in a gaseous atmosphere, is not particularly limited, and a known method may be employed. Examples of the method include a reduced pressure drying method, a heat drying method, a flash drying method, and the combination of these methods.

Especially, in the case of using the heat drying method, the heating temperature needs to be set to more than or equal to the boiling point of the hydrocarbon solvent and less than or equal to the highest temperature at which the shell structure of the precursor particles does not collapse. Therefore, depending on the composition of the shell of the precursor particles and the type of the hydrocarbon solvent, the heating temperature may be from 50° C. to 200° C., may be from 70° C. to 180° C., or may be from 100° C. to 150° C., for example.

The hydrocarbon solvent in the interior of the precursor particles is replaced with the outside gas by drying operation in the gaseous atmosphere. As a result, the hollow particles in which the hollow portion is occupied by gas are obtained.

The drying atmosphere is not particularly limited and may be appropriately selected depending on the intended application of the hollow particles. Possible examples of the drying atmosphere include air, oxygen, nitrogen and argon. Further, by filling the interior of the hollow particles with gas once and then performing reduced pressure drying, hollow particles in which the interior is evacuated are also temporarily obtained.

As another method, the hydrocarbon solvent may be removed as follows: the precursor composition obtained in the polymerization step, which is in the form of slurry, is not subjected to solid-liquid separation and, instead, in the slurry containing the precursor particles and the aqueous medium, the hydrocarbon solvent included in the precursor particles is replaced with the aqueous medium of the slurry, thereby removing the hydrocarbon solvent.

In this method, at a temperature equal to or more than the temperature obtained by subtracting 35° C. from the boiling point of the hydrocarbon solvent, an inert gas is bubbled into the precursor composition for removal of the hydrocarbon solvent included in the precursor particles of the precursor composition. Accordingly, the residual amount of the hydrocarbon solvent in the hollow particles can be reduced.

When the hydrocarbon solvent is a mixed solution containing several types of hydrocarbon solvents and it has several boiling points, the boiling point of the hydrocarbon solvent in the solvent removal step is determined as the boiling point of the solvent having the highest boiling point among the solvents contained in the mixed solvent, that is, the highest boiling point of the several boiling points.

The temperature at the time of bubbling the inert gas into the precursor composition, is preferably a temperature equal to or more than the temperature obtained by subtracting 30° C. from the boiling point of the hydrocarbon solvent, and more preferably a temperature equal to or more than the temperature obtained by subtracting 20° C. from the boiling point of the hydrocarbon solvent, from the viewpoint of reducing the residual amount of the hydrocarbon solvent in the hollow particles. The temperature at the time of bubbling is generally set to a temperature equal to or more than the polymerization temperature of the polymerization step. The temperature at the time of bubbling is not particularly limited, and it may be 50° C. or more and 100° C. or less.

The inert gas used for the bubbling is not particularly limited. As the inert gas, examples include, but are not limited to, nitrogen and argon.

Depending on the type and amount of the hydrocarbon solvent, the bubbling condition is appropriately controlled so that the hydrocarbon solvent included in the precursor particles can be removed. The condition is not particularly limited. For example, the inert gas may be bubbled in an amount of 1 L/min to 3 L/min for 1 hour to 10 hours.

By this method, an aqueous slurry in which the aqueous medium is included in the precursor particles, is obtained. The slurry is subjected to solid-liquid separation to obtain hollow particles, and the aqueous medium in the hollow particles is removed, thereby obtaining the hollow particles in which the hollow portion is occupied by gas.

The method for obtaining the hollow particles in which the hollow portion is filled with gas, by subjecting the precursor composition in the form of slurry to solid-liquid separation and then removing the hydrocarbon solvent in the precursor particles in the gaseous atmosphere, is compared to the method for obtaining the hollow particles in which the hollow portion is filled with gas, by replacing, in the slurry containing the precursor particles and the aqueous medium, the hydrocarbon solvent included in the precursor particles with the aqueous medium of the slurry, subjecting the slurry to solid-liquid separation, and then removing the aqueous medium in the precursor particles in the gaseous atmosphere. As a result, the former method is advantageous in that the hollow particles are less likely to collapse in the hydrocarbon solvent removal step, and the latter method is advantageous in that the residual amount of the hydrocarbon solvent is decreased by bubbling with inert gas.

(6) Others

In addition to the steps (1) to (5) mentioned above, the following washing step (6-a) and the following re-substitution step of hollow portion (6-b) may be added, for example.

(6-a) Washing step

The washing step includes carrying out washing by adding acid or alkali, for removal of the dispersant remaining in the precursor composition containing the precursor particles before the solvent removal step. When the dispersant used is an acid-soluble inorganic compound, washing is preferably carried out by adding acid to the precursor composition containing the precursor particles. When the dispersant used is an alkali-soluble inorganic compound, washing is preferably carried out by adding alkali to the precursor composition containing the precursor particles.

When the acid-soluble inorganic compound is used as the dispersant, the pH of the precursor composition is preferably controlled to 6.5 or less, and more preferably 6 or less, by adding acid to the precursor composition. As the added acid, an inorganic acid such as sulfuric acid, hydrochloric acid and nitric acid or an organic acid such as formic acid and acetic acid may be used. Of them, sulfuric acid is particularly preferred due to its high dispersant removal efficiency and small influence on production equipment.

(6-b) Re-Substitution Step of Hollow Portion

The re-substitution step includes resubstituting the gas and liquid in the interior of the hollow particles with another gas or liquid. By such substitution, the environment of the interior of the hollow particles can be changed; molecules can be selectively confined in the interior of the hollow particles; or the chemical structure of the interior of the hollow particles can be modified in accordance with the intended application thereof.

2. Hollow Particles (1) Shape (Morphology) of Hollow Particles

The shape of the hollow particles is not particularly limited, as long as the hollow portion is formed in the interior. Examples of the shape include a spherical shape, an ellipsoidal shape and an irregular shape. Among them, a spherical shape is preferable in terms of ease of production.

The hollow particles may have one or two or more hollow portions. The shell of the hollow particles and, when the hollow particles have two or more hollow portions, a partition separating the adjacent hollow portions from each other may be porous. The interior of the particles preferably has only one hollow portion in order to maintain good balance between the high void ratio of the hollow particles and the mechanical strength of the hollow particles.

The average circularity of the hollow particles may be from 0.950 to 0.995.

An example of the image of the shape of the hollow particles is a bag made of a thin film and inflated with gas. A cross-section of the bag is like the hollow particle 100 shown in the diagram (5) of FIG. 1 described later. In this example, one thin film is provided on the outside, and the interior is filled with gas.

The shape of the particles can be determined by SEM or TEM, for example. Further, the shape of the interior of the particles can be determined by SEM or TEM after cutting the particles into round slices by a known method.

In the present disclosure, the thickness of the shell of the hollow particles can be 0.020 $\mu$m or more and 1.20 $\mu$m or less, and preferably 0.100 $\mu$m or more and 1.00 $\mu$m or less. Accordingly, a decrease in mechanical strength can be suppressed while maintaining the void ratio of the hollow particles.

In the present disclosure, the thickness of the shell of the hollow particles is the average value of the thicknesses of 20 points of the shell of the hollow particles. The thickness of the shell of the hollow particles can be measured by SEM observation of shell fragments obtained by breaking the hollow particles, for example.

(2) Volume Average Particle Diameter of Hollow Particles

The lower limit of the volume average particle diameter of the hollow particles is preferably 4.0 $\mu$m or more, more preferably 4.5 $\mu$m or more, and still more preferably 5.0 $\mu$m or more. On the other hand, the upper limit of the volume average particle diameter of the hollow particles is preferably 25.0 $\mu$m or less, more preferably 13.0 $\mu$m or less, still more preferably 12.0 $\mu$m or less, and particularly preferably 10.0 $\mu$m or less.

When the volume average particle diameter of the hollow particles is equal to or more than the lower limit, aggregability of the hollow particles is lowered. Accordingly, excellent dispersibility can be exerted. On the other hand, when the volume average particle diameter of the hollow particles is equal to or less than the upper limit, the hollow particles are less likely to collapse and obtain high mechanical strength, accordingly.

(3) Particle Size Distribution of Hollow Particles

The particle size distribution (volume average particle diameter (Dv)/number average particle diameter (Dn)) of the hollow particles may be from 1.1 or more and 2.5 or less, for example. When the particle size distribution is 2.5 or less, particles which have small variation in compressive strength characteristics and heat resistance between the particles, can be obtained. Since the particle size distribution is 2.5 or less, a product having uniform thickness can be produced in the case of producing a molded body in a sheet form, for example.

The volume average particle diameter (Dv) and number average particle diameter (Dn) of the hollow particles can be found as follows, for example. The particle diameter of each of the hollow particles is measured with a laser diffraction particle size distribution measuring apparatus; the number average and volume average of the particle diameters are calculated; and the obtained values can be used as the number average particle diameter (Dn) and volume average particle diameter (Dv) of the particles. The particle size distribution is found by dividing the volume average particle diameter by the number average particle diameter.

(4) Void Ratio of Hollow Particles

The void ratio of the hollow particles obtained by the production method of the present disclosure, is 50% or more and 90% or less, preferably 50% or more and 85% or less, and more preferably 60% or more and 80% or less. When the void ratio is equal to or more than the lower limit, the hollow particles obtain excellent lightness in weight, heat resistance and heat insulating properties, and the volatile compounds are less likely to remain in the interior of the particles. When the void ratio is equal to or less than the upper limit, the hollow particles are less likely to collapse and obtain excellent strength.

The void ratio of the hollow particles obtained by the production method of the present disclosure, is calculated from the apparent density $D_1$ and true density $D_0$ of the hollow particles.

A method for measuring the apparent density $D_1$ of the hollow particles is as follows. First, approximately 30 cm$^3$ of the hollow particles are introduced into a measuring flask with a volume of 100 cm$^3$, and the mass of the introduced hollow particles is precisely weighed. Next, the measuring flask in which the hollow particles are introduced, is precisely filled with isopropanol up to the marked line while care is taken so that air bubbles do not get in. The mass of the isopropanol added to the measuring flask is precisely weighed, and the apparent density $D_1$ (g/cm$^3$) of the hollow particles is calculated by the following formula (I).

Apparent Density $D_1$=[Mass of the hollow particles]/ (100−[Mass of the isopropanol]/[Specific gravity of the isopropanol at the measuring temperature])          Formula (I)

The apparent density $D_1$ is equivalent to the specific gravity of the whole hollow particle in the case where the hollow portion is regarded as a part of the hollow particle.

A method for measuring the true density D; of the hollow particles is as follows. The hollow particles are pulverized in advance; approximately 10 g of the pulverized hollow particles are introduced into a measuring flask with a volume of 100 cm$^3$; and the mass of the introduced pulverized particles is precisely weighed. After that, similarly to the measurement of the apparent density mentioned above, isopropanol is added to the measuring flask; the mass of the isopropanol is precisely weighed; and the true density Do (g/cm$^3$) of the hollow particles is calculated by the following formula (II).

True density $D_0$=[Mass of the pulverized hollow particles]/(100−[Mass of the isopropanol]/[Specific gravity of the isopropanol at the measuring temperature])          Formula (II)

The true density $D_0$ is equivalent to the specific gravity of the shell portion alone of the hollow particle. As is clear from the measurement method mentioned above, when calculating the true density $D_0$, the hollow portion is not regarded as a part of the hollow particle.

The void ratio (%) of the hollow particles is calculated by the following formula (III) from the apparent density $D_i$ and true density $D_0$ of the hollow particles.

Void ratio (%)=100−(Apparent density $D_1$/True density $D_0$)×100          Formula (III)

The void ratio of the hollow particle can be reworded as the ratio occupied by the hollow portion in the specific gravity of the hollow particle.

(5) Thickness of Shell

In the present disclosure, the thickness of the shell of the hollow particles is 0.2 μm or more and less than 0.9 μm, preferably 0.2 μm or more and 0.8 μm or less, more preferably 0.25 μm or more and 0.7 μm or less, still more preferably 0.25 μm or more and 0.6 μm or less, and yet more preferably 0.25 μm or more and 0.5 μm or less.

The thickness of the shell of the hollow particles can be calculated as follows. The inner diameter r is calculated by the following equation (1) using the volume average particle diameter R and void ratio of the hollow particles, and the thickness of the shell is calculated by the following equation (2) using the inner diameter r and the volume average particle diameter R.

$4/3\Pi×(R/2)^3×$Void ratio$=4/3\Pi×(r/2)^3$          Equation (1)

Shell thickness$=(R−r)/2$          Equation (2)

The difference between the shell thickness calculated as described above and the average value of the actually measured thicknesses of 20 points of the shell, is generally within ±10% of the average value of them. Accordingly, the thickness of the shell calculated as described above can be considered as the thickness of the shell of the hollow particles.

The thickness of each point of the shell of the hollow particles, which is used to obtain the average value of the thicknesses of 20 points of the shell, can be measured by SEM observation of shell fragments obtained by breaking the hollow particles, for example.

(6) Amount of Volatile Compounds

In the hollow particles obtained by the production method of the present disclosure, with respect to the total mass (100% by mass) of the hollow particles, the amount of the volatile compounds is preferably 0.5% by mass or less, more preferably 0.3% by mass or less, and still more preferably 0.2% by mass or less. Since the amount of the volatile compounds in the hollow particles is equal to or less than the upper limit, when mixing the hollow particles of the present disclosure with other materials, there is no possibility that the volatile compounds in the hollow particles volatilize to cause foaming or cause ignition. In addition, since the specific gravity of the hollow particles can be reduced, the effect of the hollow particles as a weight reducing material can be enhanced.

In the present disclosure, the volatile compounds are compounds that volatilize at the time of kneading a resin composition containing the hollow particles of the present disclosure, and typically, the volatile compounds are compounds that volatilize at the time of melt-kneading a resin composition containing the hollow particles of the present disclosure. In general, the volatile compounds are compounds having a boiling point of 235° C. or less and a molecular weight of 200 or less. The volatile compounds contained in the hollow particles are typically the hydrocarbon solvent which is used to produce the hollow particles and an unreacted polymerizable monomer remaining in the particles.

A method of measuring the amount of the volatile compounds in the hollow particles is as follows.

First, approximately 100 mg of the hollow particles are put into a 30 mL screw cap glass bottle and precisely weighed. Subsequently, approximately 10 g of tetrahydrofuran (THF) is put into the glass bottle and precisely weighed. The mixture in the glass bottle is stirred for 1 hour with a stirrer, and the volatile compounds contained in the hollow particles are extracted. The stirring is stopped; the resin components of the hollow particles insoluble in THF are precipitated; then, the precipitate is filtered out to obtain a sample liquid. The filtration can be performed by installing a filter (product name: MEMBRANE FILTER 25JP020AN, manufactured by: Advantec Co., Ltd.) at a syringe barrel, for example. The sample liquid is analyzed by gas chromatography (GC), and the amount (% by mass) of the volatile compounds per unit mass contained in the hollow particles, is found from a peak area of GC and a calibration curve created in advance. Detailed analysis conditions are as follows.

(Analysis Conditions)

Apparatus: GC-2010 (manufactured by Shimadzu Corporation)

Column: DB-5 (manufactured by Agilent Technologies Japan, Ltd.)

Membrane thickness 0.25 μm, Inner diameter 0.25 mm, Length 30 m

Detector: FID

Carrier gas: Nitrogen (linear velocity: 28.8 cm/sec)

Temperature of the injection port: 200° C.

Temperature of the detector: 250° C.

Temperature of the oven: Raised from 40° C. to 230° C. at a rate of 10° C./minute, and held at 230° C. for 2 minutes Amount of sampling: 2 μL 3. Applications of Hollow Particles Possible examples of the intended application of the hollow particles include an under-coating material of thermal paper. In general, an under-coating material is required to have heat insulation properties and shock-absorbing properties (cushioning properties). In addition, it is required to have heat resistance in line with thermal paper uses. The hollow particles of the present disclosure can meet these requirements since they have high void ratio, collapse-resistant hollow shape, number average particle diameter small enough to ensure coating flatness, and high heat resistance. Further, the hollow particles are useful as, for example, a plastic pigment that is excellent in gloss, hiding power, etc.

The hollow particles of the present disclosure are less likely to collapse when mixed and kneaded with other materials, so that they exert excellent effects as a weight reducing material, a heat insulation material, an acoustic insulation material, a damping material and so on, when they are added to a molded body. Accordingly, the hollow particles of the present disclosure are suitable as an additive for molded body. The hollow particles of the present disclosure are less likely to collapse even when kneaded with a resin and even when molded into a product after kneading with a resin. Accordingly, the hollow particles are particularly suitably used as an additive for molded body made of resin. The molded body containing the hollow particles of the present disclosure may contain, as the resin, a thermoplastic or thermosetting resin such as polyethylene, polypropylene, polyvinyl chloride, polystyrene, polyurethane, epoxy resin, acrylonitrile-butadiene-styrene (ABS) resin, acrylonitrile-styrene (AS) resin, poly(meth)acrylate, polycarbonate, polyamide, polyimide, polyphenylene ether, polyphenylene sulfide, polyester, polytetrafluoroethylene, polyphenylene oxide and cyanate resin. The molded body containing the hollow particles of the present disclosure may further contain fibers such as carbon fibers, glass fibers, aramid fibers and polyethylene fibers. The hollow particles obtained by the production method of the present disclosure can be contained as a filler in a molded body formed by use of a thermoplastic or thermosetting resin and in a molded body formed by use of a material containing a thermoplastic or thermosetting resin and fibers.

A useful component such as a perfume, a medicine, an agricultural chemical and an ink component can be enclosed in the interior of the hollow particles by a means such as immersion treatment or depressurized or pressurized immersion treatment. The hollow particles in which such a useful component is enclosed, can be used for various applications in accordance with the component contained in the interior. In addition, the hollow particles can be used in members such as a light reflective material, a heat insulation material, a sound insulation material and a low dielectric material, which are used in the automotive field, the electronic field, the electric field, the architecture field, the aviation field, the space field and so on. In addition, the hollow particles can be used in food containers or the like.

EXAMPLES

Hereinbelow, the present invention is described more specifically using examples and comparative examples. However, the present invention is not limited to these examples. Also, "part(s)" and "%" are on a mass basis unless otherwise specified.

<A. Preparation of Polar Resin>

Production Example 1: Production of Polar Resin a
(MMA/AA/EA Copolymer)

First, 200 parts of toluene was put in a reaction container. While stirring the toluene, the gas inside the reaction container was sufficiently replaced with nitrogen. Then, the temperature of the toluene was raised to 90° C. Then, a mixed solution of 96.2 parts of methyl methacrylate (MMA), 0.3 parts of acrylic acid (AA), 3.5 parts of ethyl acrylate (EA) and 2.8 parts of t-butylperoxy-2-ethylhexanoate (manufactured by: Nippon Oil & Fats Co., Ltd., product name: PERBUTYL O) was added dropwise to the reaction container for two hours. Also, the condition of the mixture was maintained for 10 hours under toluene flux, thereby completing polymerization. Then, the solvent was removed by distillation under reduced pressure to obtain a polar resin A (an MMA/AA/EA copolymer).

Of the total mass (100%) of the repeating units constituting the obtained polar resin A (the MMA/AA/EA copolymer), the proportion of the MMA-derived repeating units was 96.2%; that of the AA-derived repeating units was 0.3%; and that of the EA-derived repeating units was 3.5%.

The number average molecular weight of the obtained polar resin A (the MMA/AA/EA copolymer) was 10000.

The number average molecular weight was obtained as a polystyrene equivalent molecular weight measured by gel permeation chromatography (GPC) in which tetrahydrofuran at a flow rate of 0.35 ml/min was used as a carrier.

For the measurement, HLC8220 (manufactured by Tosoh Corporation) was used as the measurement device; three Shodex (registered trademark) KF-404HQ columns (manufactured by Showa Denko K. K.) were connected and used (column temperature 40° C.); detectors used were a refractive index detector and an ultraviolet detector; and molecular weight calibration was carried out on 12 points of standard polystyrene (500 to 3000000) manufactured by Polymer Laboratory Ltd.

Production Example 2: Production of Polar Resin B (MMA/HEMA/EA Copolymer)

First, 200 parts of toluene was put in a reaction container. While stirring the toluene, the gas inside the reaction container was sufficiently replaced with nitrogen. Then, the temperature of the toluene was raised to 90° C. Then, a mixed solution of 95.0 parts of methyl methacrylate (MMA), 3.0 parts of 2-hydroxyethyl methacrylate (HEMA), 2.0 parts of ethyl acrylate (EA) and 2.8 parts of t-butylperoxy-2-ethylhexanoate (manufactured by: Nippon Oil & Fats Co., Ltd., product name: PERBUTYL O) was added dropwise to the reaction container for two hours. Also, the condition of the mixture was maintained for 10 hours under toluene flux, thereby completing polymerization. Then, the solvent was removed by distillation under reduced pressure to obtain a polar resin B (an MMA/HEMA/EA copolymer).

Of the total mass (100%) of the repeating units constituting the obtained polar resin B (the MMA/HEMA/EA copolymer), the proportion of the MMA-derived repeating units was 95.0%; that of the HEMA-derived repeating units was 3.0%; and that of the EA-derived repeating units was 2.0%.

The number average molecular weight of the obtained polar resin B (the MMA/HEMA/EA copolymer) was 10000.

[Production of Polar Resin C (PMMA)]

First, 200 parts of toluene was put in a reaction container. While stirring the toluene, the gas inside the reaction container was sufficiently replaced with nitrogen. Then, the temperature of the toluene was raised to 90° C. Then, a mixed solution of 100 parts of methyl methacrylate (MMA) and 2.8 parts of t-butylperoxy-2-ethylhexanoate (manufactured by: Nippon Oil & Fats Co., Ltd., product name: PERBUTYL O) was added dropwise to the reaction container for 2 hours. Also, the condition of the mixture was maintained for 10 hours under toluene flux, thereby completing polymerization. Then, the solvent was removed by distillation under reduced pressure to obtain a polar resin C (an MMA homopolymer).

The number average molecular weight of the obtained polar resin C (the MMA homopolymer) was 6000.

TABLE 1

| | Monomer types (Copolymerization ratio (%)) | Number average molecular weight |
|---|---|---|
| Polar resin A | MMA/AA/EA (96.2%:0.3%:3.5%) | 10,000 |
| Polar resin B | MMA/HEMA/EA (95.0%:3.0%:2.0%) | 10,000 |
| Polar resin C | MMA 100% | 6,000 |

The meanings of abbreviations shown in Table 1 are as follows.

MMA: Methyl methacrylate

AA: Acrylic acid

EA: Ethyl acrylate

HEMA: 2-Hydroxyethyl methacrylate

<B. Production of Hollow Particles>

Example 1

(1) Mixture Liquid Preparation Step

First, the following materials were mixed to produce an oil phase.

Ethylene glycol dimethacrylate: 100 parts

Polar resin A (an MMA/AA/EA copolymer): 2 parts 2,2'-Azobis(2,4-dimethylvaleronitrile) (an oil-soluble polymerization initiator manufactured by Wako Pure Chemical Industries, Ltd., product name: V-65): 3 parts Cyclohexane: 187 parts Next, in a stirring tank, under a room temperature condition, an aqueous solution in which 5.5 parts of sodium hydroxide (an alkali metal hydroxide) was dissolved in 55 parts of ion-exchanged water, was gradually added under stirring to an aqueous solution in which 7.8 parts of magnesium chloride (a water-soluble polyvalent metal salt) was dissolved in 225 parts of ion-exchanged water, thereby preparing a magnesium hydroxide colloidal dispersion (a sparingly water-soluble metal hydroxide colloidal dispersion). The obtained dispersion was used as an aqueous phase.

The obtained aqueous phase and oil phase were mixed, thereby preparing a mixture liquid.

(2) Suspension Step

The mixture liquid obtained in the mixture liquid preparation step was stirred with a disperser (product name: HOMO MIXER, manufactured by: PRIMIX Corporation) for one minute at a rotational frequency of 4,000 rpm to be suspended, thereby preparing a suspension in which droplets of a monomer composition, which included cyclohexane, were dispersed in water.

(3) Polymerization Step

The suspension obtained in the suspension step was stirred in a nitrogen atmosphere at 65° C. for 4 hours, thereby performing a polymerization reaction. By this polymerization reaction, a precursor composition containing precursor particles including cyclohexane was prepared.

(4) Washing Step and Solid-Liquid Separation Step

The precursor composition obtained in the polymerization step was washed with dilute sulfuric acid (25° C., 10 minutes) to obtain a pH of 5.5 or less. Next, water was separated therefrom by filtration. Then, 200 parts of ion-exchanged water was added to the resultant to make a slurry again, and a water washing treatment (washing, filtration and dehydration) was repeatedly performed several times at room temperature (25° C.). The resultant was separated by filtration, thereby obtaining a solid component. The obtained solid component was dried with a dryer at a temperature of 40° C., thereby obtaining precursor particles including cyclohexane.

(5) Solvent Removal Step

The precursor particles obtained in the solid-liquid separation step was subjected to heating treatment with a vacuum dryer at 200° C. for 6 hours in a vacuum condition for removal of the hydrocarbon solvent from the hollow, thereby obtaining the hollow particles of Example 1. From the scanning electron microscopy result and void ratio value of the obtained hollow particles, the particles were confirmed to be spherical and to have a hollow portion.

Examples 2 to 9 and Comparative Examples 1 to 8

The hollow particles of Examples 2 to 9 and Comparative Examples 1 to 8 were produced in the same manner as Example 1, except that the materials for the oil phase prepared in the above-mentioned "(1) Mixture liquid preparation step" and the amounts of the materials were changed as shown in Table 1, and the amount of the ion-exchanged water and the type and amount of the dispersant in the aqueous phase were changed as shown in Table 1.

In Comparative Examples 1 to 8, sodium dodecylbenzene sulfonate (a surfactant) and polyvinyl alcohol were used as the dispersant.

<C. Testing of Hollow Particles>

The hollow particles obtained in Examples 1 to 9 and Comparative Examples 1 to 8 were measured and evaluated as follows.

(1) Volume Average Particle Diameter of Hollow Particles

The particle diameter of each hollow particle was measured using a laser diffraction particle size distribution measuring apparatus (product name: SALD-2000, manufactured by: Shimadzu Corporation), and the volume average particle diameter was calculated on the assumption that the hollow particles were spherical.

(2) Density and Void Ratio of Hollow Particles (i) Measurement of Apparent Density of Hollow Particles The apparent density of the hollow particles was measured in the same manner as described in the section entitled "(4) Void ratio of hollow particles" under "2. Hollow particles".

(ii) Measurement of True Density of Hollow Particles

The true density of the hollow particles was measured in the same manner as described in the section entitled "(4) Void ratio of hollow particles" under "2. Hollow particles".

(iii) Calculation of Void Ratio

The void ratio of the hollow particles was calculated in the same manner as described in the section entitled "(4) Void ratio of hollow particles" under "2. Hollow particles".

(3) Amount of Volatile Compounds in Hollow Particles

For the amount of the volatile compounds in the hollow resin particles, the amount of the volatile compounds such as the hydrocarbon solvent (e.g., cyclohexane (boiling point 80.74° C., molecular weight 84.16), ethylene glycol dimethacrylate (boiling point 235° C., molecular weight 198.22), methyl methacrylate (boiling point 101° C., molecular weight 100.12)) contained in the hollow particles, was measured in the same manner as described in the section entitled "(6) Amount of volatile compound" under "2. Hollow particles".

(4) SEM Observation of Hollow Particles

Of the hollow particles obtained in each of Examples 1 to 9 and Comparative Examples 1 to 8, 100 particles were observed by SEM to check whether or not the particles had a communication hole having a diameter of 10 nm or more and 500 nm or less and a crack-shaped defect having a length of 1 μm or more.

[Evaluation Results of Hollow Particles]

Tables 2-1 to 2-4 show the types and amounts of the materials used in Examples 1 to 9 and Comparative Examples 1 to 8, and the evaluation results of the hollow particles.

TABLE 2-1

| | | | Example 1 | Example 2 | Example 3 | Example 4 |
|---|---|---|---|---|---|---|
| Oil phase | Non-crosslinkable monomer | Methyl methacrylate (Parts) | — | — | — | — |
| | | Acrylic acid (Parts) | — | — | — | — |
| | | Ethyl acrylate (Parts) | — | — | — | — |
| | Crosslinkable monomer | Ethylene glycol dimethacrylate (Parts) | 100 | 100 | 100 | 100 |
| | | Dipentaerythritol hexaacrylate (Parts) | — | — | — | — |
| | Oil-soluble polymerization initiator | V-65 (Parts) | 3 | 3 | 3 | 3 |
| | Hydrocarbon solvent | Cyclohexane (Parts) | 187 | 83.5 | 187 | 187 |
| | | Hexadecane (Parts) | — | — | — | — |
| | Polar resin | Polar resin A MMA/AA/EA (Parts) | 2 | 2 | 1 | 0.5 |
| | | Polar resin B MMA/HEMA/EA (Parts) | — | — | — | — |
| | | Polar resin C Poly MMA (Parts) | — | — | — | — |
| Aqueous phase | Dispersant | Magnesium hydroxide (Parts) | 4 | 4 | 4 | 4 |
| | | Polyvinyl alcohol (Parts) | — | — | — | — |
| | | Sodium dodecylbenzene sulfonate (Parts) | — | — | — | — |
| | | Ion-exchanged water (Parts) | 280 | 280 | 280 | 280 |
| Hollow particles | | Volume average particle diameter (μm) | 5.5 | 5.2 | 6.5 | 8.8 |
| | | Apparent density $D_1$ (g/cm³) | 0.36 | 0.48 | 0.36 | 0.36 |
| | | True density $D_0$ (g/cm³) | 1.20 | 1.20 | 1.20 | 1.20 |
| | | Void ratio (%) | 70 | 60 | 70 | 70 |
| | | Volatile compound amount (%) | 0.05 | 0.09 | 0.08 | 0.12 |
| | | Communication hole or defect | Not found | Not found | Not found | Not found |

TABLE 2-2

| | | | Example 5 | Example 6 | Example 7 | Example 8 | Example 9 |
|---|---|---|---|---|---|---|---|
| Oil phase | Non-crosslinkable monomer | Methyl methacrylate (Parts) | — | — | 20 | 30 | — |
| | | Acrylic acid (Parts) | — | — | — | — | — |
| | | Ethyl acrylate (Parts) | — | — | — | — | — |
| | Crosslinkable monomer | Ethylene glycol dimethacrylate (Parts) | 100 | 100 | 80 | 70 | 100 |
| | | Dipentaerythritol hexaacrylate (Parts) | — | — | — | — | — |
| | Oil-soluble polymerization initiator | V-65 (Parts) | 3 | 3 | 3 | 3 | 3 |
| | Hydrocarbon solvent | Cyclohexane (Parts) | 187 | 187 | 187 | 187 | 187 |
| | | Hexadecane (Parts) | — | — | — | — | — |
| | Polar resin | Polar resin A MMA/AA/EA (Parts) | — | — | 2 | 2 | 8 |
| | | Polar resin B MMA/HEMA/EA (Parts) | 1 | — | — | — | — |
| | | Polar resin C Poly MMA (Parts) | — | 0.5 | — | — | — |
| Aqueous phase | Dispersant | Magnesium hydroxide (Parts) | 4 | 4 | 4 | 4 | 4 |
| | | Polyvinyl alcohol (Parts) | — | — | — | — | — |
| | | Sodium dodecylbenzene sulfonate (Parts) | — | — | — | — | — |
| | | Ion-exchanged water (Parts) | 280 | 280 | 280 | 280 | 280 |
| Hollow particles | | Volume average particle diameter (μm) | 5.8 | 9.2 | 5.4 | 5.2 | 5.1 |
| | | Apparent density $D_1$ (g/cm$^3$) | 0.36 | 0.36 | 0.36 | 0.36 | 0.36 |
| | | True density $D_0$ (g/cm$^3$) | 1.20 | 1.20 | 1.20 | 1.20 | 1.20 |
| | | Void ratio (%) | 70 | 70 | 70 | 70 | 70 |
| | | Volatile compound amount (%) | 0.08 | 0.14 | 0.04 | 0.03 | 0.03 |
| | | Communication hole or defect | Not found | Not found | Not found | Not found | No found |

TABLE 2-3

| | | | Comparative Example 1 | Comparative Example 2 | Comparative Example 3 | Comparative Example 4 |
|---|---|---|---|---|---|---|
| Oil phase | Non-crosslinkable monomer | Methyl methacrylate (Parts) | — | — | — | — |
| | | Acrylic acid (Parts) | — | — | — | — |
| | | Ethyl acrylate (Parts) | — | — | — | — |
| | Crosslinkable monomer | (Parts) Ethylene glycol dimethacrylate | 100 | 100 | 100 | 100 |
| | | Dipentaerythritol hexaacrylate (Parts) | — | — | — | — |
| | Oil-soluble polymerization initiator | V-65 (Parts) | 3 | 3 | 3 | 3 |
| | Hydrocarbon solvent | Cyclohexane (Parts) | 45 | 187 | 610 | 187 |
| | | Hexadecane (Parts) | — | — | — | — |
| | Polar resin | Polar resin A MMA/AA/EA (Parts) | 1 | — | 1 | — |
| | | Polar resin B MMA/HEMA/EA (Parts) | — | — | — | — |
| | | Polar resin C Poly MMA (Parts) | — | — | — | — |

TABLE 2-3-continued

|  |  |  | Comparative Example 1 | Comparative Example 2 | Comparative Example 3 | Comparative Example 4 |
|---|---|---|---|---|---|---|
| Aqueous phase | Dispersant | Magnesium hydroxide (Parts) | 4 | 4 | 16 | — |
|  |  | Polyvinyl alcohol (Parts) | — | — | — | — |
|  |  | Sodium dodecylbenzene sulfonate (Parts) | — | — | — | 3 |
|  |  | Ion-exchanged water (Parts) | 280 | 280 | 1120 | 280 |
| Hollow particles | Volume average particle diameter (μm) |  | 5.1 | 15.2 | 6.2 | 3.2 |
|  | Apparent density $D_1$ (g/cm$^3$) |  | 0.48 | 0.36 | 0.12 | 0.36 |
|  | True density $D_0$ (g/cm$^3$) |  | 1.20 | 1.20 | 1.19 | 1.20 |
|  | Void ratio (%) |  | 40 | 70 | 92 | 70 |
|  | Volatile compound amount (%) |  | 40.5 | 50.7 | 0.02 | 0.02 |
|  | Communication hole or defect |  | Not found | Not found | Not found | Not found |

TABLE 2-4

|  |  |  | Comparative Example 5 | Comparative Example 6 | Comparative Example 7 | Comparative Example 8 |
|---|---|---|---|---|---|---|
| Oil phase | Non-crosslinkable monomer | Methyl methacrylate (Parts) | 3.7 | — | — | — |
|  |  | Acrylic acid (Parts) | 0.1 | — | — | — |
|  |  | Ethyl acrylate (Parts) | 0.2 | — | — | — |
|  | Crosslinkable monomer | Ethylene glycol dimethacrylate (Parts) | 96 | — | 100 | 100 |
|  |  | Dipentaerythritol hexaacrylate (Parts) | — | 100 | — | — |
|  | Oil-soluble polymerization initiator | V-65 (Parts) | 3 | 3 | 3 | 3 |
|  | Hydrocarbon solvent | Cyclohexane (Parts) | 187 | 187 | — | 187 |
|  |  | Hexadecane (Parts) | — | — | 187 | — |
|  | Polar resin | Polar resin A MMA/AA/EA (Parts) | — | — | — | 2 |
|  |  | Polar resin B MMA/HEMA/EA (Parts) | — | — | — | — |
|  |  | Polar resin C Poly MMA (Parts) | — | — | 0.5 | — |
| Aqueous phase | Dispersant | Magnesium hydroxide (Parts) | 4 | — | — | — |
|  |  | Polyvinyl alcohol (Parts) | — | — | 3 | — |
|  |  | Sodium dodecylbenzene sulfonate (Parts) | 3 | 3 | — | 3 |
|  |  | Ion-exchanged water (Parts) | 280 | 280 | 280 | 280 |
| Hollow particles | Volume average particle diameter (μm) |  | 14.5 | 3.5 | 11.0 | 3.2 |
|  | Apparent density $D_1$ (g/cm$^3$) |  | 0.36 | 0.36 | 0.36 | 0.36 |
|  | True density $D_0$ (g/cm$^3$) |  | 1.20 | 1.20 | 1.20 | 1.19 |
|  | Void ratio (%) |  | 70 | 70 | 70 | 70 |
|  | Volatile compound amount (%) |  | 45.3 | 0.01 | 35.6 | 0.02 |
|  | Communication hole or defect |  | Not found | Found | Not found | Not found |

<D. Production of Molded Body>

Example 10

First, 10 parts of the hollow particles obtained in Example 1 and, as a thermoplastic resin, 90 parts of polypropylene (manufactured by: Mitsubishi Chemical Corporation, product name: MA1B, specific gravity: 0.90 g/cm$^3$) were mixed by a blender. Next, a resin composition thus obtained was kneaded by a biaxial kneader (product name: TEM-35B, manufactured by: Toshiba Machine Co., Ltd.) in the following kneading condition, extruded and then pelletized, thereby obtaining pellets of the resin composition.

Kneading Condition:

Screw diameter: 37 mm, L/D=32

Screw rotational frequency: 250 rpm

Resin temperature: 190° C.

Feed rate: 20 kg/h

The obtained pellets of the resin composition were dried by heating at 80° C. for 6 hours. Then, using an injection molding machine, a molded body (size: 80 mm×10 mm×4 mm (thickness)) was obtained in the following molding condition.

Molding Condition:

Cylinder temperature: 230° C.

Mold temperature: 40° C.

Injection pressure: 70 MPa

Examples 11 to 20 and Comparative Examples 9 to 13

Molded bodies of the resin compositions of Examples 11 to 20 and Comparative Examples 9 to 13 were produced in the same manner as Example 10, except that the type and amount of the thermoplastic resin were changed as shown in Tables 2-1 to 2-4, and the type and amount of the hollow particles were changed as shown in Tables 2-1 to 2-4.

In Tables 2-1 to 2-4, the term "PA-6" found in some columns under the title "Thermoplastic resin" means a commercially-available polyamide resin (manufactured by: Unitika Ltd., product name: A1020BRL, specific gravity: 1.13 g/cm$^3$), and the term "Glass balloons" found in a column under the title "Hollow particles" means commercially-available glass hollow particles (manufactured by: 3M Japan Limited, product name: GLASS BUBBLES iM30K, specific gravity: 0.6 g/cm$^3$).

<E. Testing of Molded Bodies>

On each of the molded bodies thus obtained, measurement of specific gravity, calculation of weight reduction rate, calculation of specific gravity increase rate, and measurement of variation in specific gravity were carried out.

(1) Specific Gravity of Molded Body

The specific gravity of the molded body was measured by an underwater replacement method in accordance with JIS K 7112.

(2) Specific Gravity of Hollow Particles

As the specific gravity of the hollow particles, the apparent density values shown in Tables 2-1 to 2-4 were employed.

(3) Weight Reduction Rate

The weight reduction rate was calculated by the following equation (4).

$$\text{Weight reduction rate (\%)} = 100 \times (1 - \text{Specific gravity of the molded body/Specific gravity of the thermoplastic resin alone)} \qquad \text{Equation (4)}$$

(4) Specific Gravity Increase Rate

When the hollow particles in the thermoplastic resin composition, which is a molding material, do not collapse at all in injection molding, the specific gravity of the molded body and the specific gravity of the thermoplastic resin composition are the same. When the hollow particles in the molding material collapse in injection molding, the specific gravity of the molded body is larger than the specific gravity of the thermoplastic resin composition (the molding material). Accordingly, to evaluate the degree of the collapse of the hollow particles in injection molding, the rate of the increase in the specific gravity of the molded body with respect to the theoretical specific gravity of the thermoplastic resin composition, was calculated.

The specific gravity increase rate was calculated by the following equation (5). The theoretical specific gravity of the thermoplastic resin is shown in Table 3, which was obtained from the ratio between the weight of the thermoplastic resin and that of the hollow particles, the specific gravity of the thermoplastic resin, and the specific gravity of the hollow particles.

$$\text{Specific gravity increase rate (\%)} = 100 \times (\text{Specific gravity of the molded body/Theoretical specific gravity of the resin composition} - 1) \qquad \text{Equation (5)}$$

[Evaluation Results of the Molded Bodies]

Table 3 shows the types and amounts of the thermoplastic resins and hollow particles used in Examples 10 to 20 and Comparative Examples 9 to 13, and the evaluation results of the molded bodies of the resin compositions.

TABLE 3

| | Resin composition | | | | | | Theoretical specific gravity of resin composition (g/cm$^3$) | Specific gravity of molded body (g/cm$^3$) | Weight reduction rate (%) | Specific gravity increase rate (%) |
|---|---|---|---|---|---|---|---|---|---|---|
| | Thermoplastic resin | | | Hollow particles | | | | | | |
| | Type | Specific gravity (g/cm) | (Parts) | Type | Specific gravity (g/cm) | (Parts) | | | | |
| Example 10 | PP | 0.90 | 90 | Example 1 | 0.36 | 10 | 0.846 | 0.852 | 5.3 | 0.7 |
| Example 11 | PP | 0.90 | 90 | Example 2 | 0.48 | 10 | 0.856 | 0.860 | 4.4 | 0.2 |
| Example 12 | PP | 0.90 | 90 | Example 3 | 0.36 | 10 | 0.846 | 0.850 | 5.6 | 0.5 |
| Example 13 | PP | 0.90 | 90 | Example 4 | 0.36 | 10 | 0.846 | 0.851 | 5.4 | 0.6 |
| Example 14 | PP | 0.90 | 90 | Example 5 | 0.36 | 10 | 0.846 | 0.856 | 4.9 | 1.2 |
| Example 15 | PP | 0.90 | 90 | Example 6 | 0.36 | 10 | 0.846 | 0.854 | 5.1 | 0.9 |
| Example 16 | PP | 0.90 | 90 | Example 7 | 0.36 | 10 | 0.846 | 0.858 | 4.7 | 1.4 |
| Example 17 | PP | 0.90 | 90 | Example 8 | 0.36 | 10 | 0.846 | 0.860 | 4.4 | 1.7 |
| Example 18 | PP | 0.90 | 90 | Example 9 | 0.36 | 10 | 0.846 | 0.865 | 3.9 | 2.2 |
| Example 19 | PA-6 | 1.13 | 90 | Example 1 | 0.36 | 10 | 1.053 | 1.062 | 6.0 | 0.9 |
| Example 20 | PA-6 | 1.13 | 90 | Example 2 | 0.48 | 10 | 1.065 | 1.070 | 5.3 | 0.5 |
| Comparative Example 9 | PP | 0.90 | 90 | Comparative Example 3 | 0.12 | 10 | 0.822 | 0.890 | 1.1 | 8.3 |
| Comparative Example 10 | PP | 0.90 | 90 | Comparative Example 4 | 0.36 | 10 | 0.846 | 0.890 | 1.1 | 5.2 |
| Comparative Example 11 | PP | 0.90 | 80 | Glass balloons | 0.6 | 20 | 0.840 | 0.900 | 0.0 | 7.1 |
| Comparative Example 12 | PP | 0.90 | 90 | Comparative Example 6 | 0.36 | 10 | 0.846 | 0.895 | 0.6 | 5.8 |
| Comparative Example 13 | PP | 0.90 | 90 | Comparative Example 8 | 0.36 | 10 | 0.846 | 0.890 | 1.1 | 5.2 |

[Consideration]

Hereinafter, the evaluation results of the examples and comparative examples will be examined with reference to Tables 2 and 3.

In Comparative Example 1, since the content of the hydrocarbon solvent in the mixture liquid was insufficient, the void ratio of the obtained hollow particles was low, and the amount of the volatile compounds in the obtained hollow particles was large. The reason for the large amount of the volatile compounds is considered as follows: due to the low void ratio, the thickness of the shell of the hollow particles increased and made the removal of the volatile compounds difficult.

In Comparative Example 2, magnesium hydroxide, which is a sparingly water-soluble inorganic metal salt, was added to the mixture liquid. However, since a polar resin was not added, the volume average particle diameter of the obtained hollow particles was excessively large, and the amount of the volatile compounds was large. The reason for the large amount of the volatile compounds is considered as follows: due to the large volume average particle diameter of the hollow particles, the thickness of the shell of the hollow particles increased and made the removal of the hydrocarbon solvent from the hollow particles difficult.

In Comparative Example 3, since the content of the hydrocarbon solvent in the mixture liquid was too large, as shown in Table 1, the void ratio of the obtained hollow particles was excessively high. Accordingly, the molded body produced by use of the hollow particles of Comparative Example 3 had a low weight reduction rate and a high specific gravity increase rate. The reason is considered as follows: due to the high void ratio of the hollow particles, the thickness of the shell of the hollow particles decreased, and the hollow particles collapsed at the time of mixing and kneading with the thermoplastic resin or at the time of molding.

In Comparative Example 4, since a polar resin was not added and sodium dodecylbenzene sulfonate, which is a surfactant, was added as the dispersant, the volume average particle diameter of the hollow particles was small. Accordingly, the molded body of Comparative Example 10 produced by use of the hollow particles of Comparative Example 4 had a low weight reduction rate and a high specific gravity increase rate. The reason is considered as follows: due to the small volume average particle diameter of the hollow particles, the shell failed to obtain a sufficient thickness, and the hollow particles collapsed at the time of mixing and kneading with the thermoplastic resin or at the time of molding.

In Comparative Example 5, instead of the polar resin of Example 1, components corresponding to the monomers for the polar resin were added in the same amount as the copolymerization amount of the polar resin; moreover, sodium dodecylbenzene sulfonate, which is a surfactant, and the magnesium hydroxide of Example 1 were added in combination as the dispersant. As a result, the volume average particle diameter of the obtained hollow particles was excessively large, and the amount of the volatile compounds was large. The reason for the large amount of the volatile compounds, is presumed as follows: due to the large volume average particle diameter of the hollow particles, the thickness of the shell of the hollow particles increased and made the removal of the hydrocarbon solvent from the hollow particles difficult.

Comparative Example 6 was carried out in the same manner as Comparative Example 4, except that dipentaerythritol hexaacrylate was used as the crosslinkable monomer instead of ethylene glycol dimethacrylate. As a result, in Comparative Example 6, since the polar resin was not added and sodium dodecylbenzene sulfonate, which is a surfactant, was added as the dispersant, the volume average particle diameter of the hollow particles was small. Accordingly, the molded body of Comparative Example 12 produced by use of the hollow particles of Comparative Example 6 had a low weight reduction rate and a high specific gravity increase rate. The reason is considered as follows: due to the small volume average particle diameter of the hollow particles, the shell failed to obtain a sufficient thickness, and the hollow particles collapsed at the time of mixing and kneading with the thermoplastic resin or at the time of molding.

Of the hollow particles obtained in Comparative Example 6, 100 particles were observed by SEM. As a result, it was found that 20 out of the 100 hollow particles had a communication hole having a diameter of 10 nm or more and 500 nm or less or a crack-shaped defect having a length of 1 μm or more.

The reason is estimated as follows: since, in Comparative Example 6, a sparingly water-soluble inorganic metal salt was not added and sodium dodecylbenzene sulfonate, which is a surfactant, was only added, the hollow particles obtained a small particle diameter, and since the trifunctional or higher-functional acrylate was only used as the polymerizable monomer for shell, the shell was deformed after polymerization.

In Comparative Example 7, 0.5 parts of poly(methyl methacrylate) was added as the polar resin. However, since polyvinyl alcohol was added as the dispersant, the volume average particle diameter of the obtained hollow particles was excessively large, and the amount of the volatile compounds was large. The reason for the large amount of the volatile compounds is considered as follows: due to the large volume average particle diameter of the hollow particles, the thickness of the shell of the hollow particles increased and made the removal of the hydrocarbon solvent from the hollow particles difficult.

In Comparative Example 8, the polar resin was added, and sodium dodecylbenzene sulfonate, which is a surfactant, was added as the dispersant. However, the volume average particle diameter of the obtained hollow particles was small. The molded body of Comparative Example 13 produced by use of the hollow particles of Comparative Example 8 had a low weight reduction rate and a high specific gravity increase rate. The reason is considered as follows: due to the small volume average particle diameter of the hollow particles, the shell failed to obtain a sufficient thickness, and the hollow particles collapsed at the time of mixing and kneading with the thermoplastic resin or at the time of molding.

From the results of Comparative Example 8, it was confirmed that even though the polar resin and sodium dodecylbenzene sulfonate, which is a surfactant, are used in combination, the effects exerted by combining the polar resin and the sparingly water-soluble inorganic metal salt are not obtained.

In Comparative Example 10, a molded body was obtained by, instead of hollow particles, mixing and kneading glass balloons with a thermoplastic resin. Accordingly, the weight reduction rate of the molded body of Comparative Example 10 was 0% and very low, and the specific gravity increase rate was high. The reason is considered to be because the glass balloons failed to withstand the load applied at the time of mixing and kneading and broke.

In Examples 1 to 9, the polar resin was added to the mixture liquid, and magnesium hydroxide, which is a sparingly water-soluble inorganic metal salt, was used as the dispersant added to the aqueous phase. Accordingly, the volume average particle diameter of the obtained hollow particles was within an appropriate range; the void ratio was within an appropriate range of from 50% to 90%; and the residual hydrocarbon solvent amount was reduced.

The molded bodies obtained by use of the hollow particles obtained in Examples 1 to 9, obtained high weight reduction rates of from 3.9% to 6.0% and low specific gravity increase rates of from 0.2% to 2.2%, and the collapse of the hollow particles at the time of mixing and kneading with the thermoplastic resin or at the time of molding, was suppressed.

The reason is presumed as follows: by adding the polar resin to the mixture liquid and using magnesium hydroxide, which is a sparingly water-soluble inorganic metal salt, as the dispersant added to the aqueous phase, the thickness of the shell was controlled to an appropriate thickness, and the mechanical strength of the hollow particles was increased while suppressing an increase in the residual amount of the hydrocarbon solvent.

Especially in Examples 1 to 3, 5, 7 and 8, in all of which the amount of the added polar resin was from 1.0 part by mass to 2.0 parts by mass with respect to the total lass (100 parts by mass) of the polymerizable monomer, the obtained hollow particles are far less likely to collapse, and the residual amount of the hydrocarbon solvent was more reduced.

The hollow particles obtained in Examples 1 to 9 were observed by SEM. As a result, in all of Examples 1 to 9, it was found that the number of the particles which had a communication hole having a diameter of 10 nm or more and 500 nm or less or a crack-shaped defect having a length of 1 μm or more, was 5 or less out of 100. Accordingly, it was confirmed that hollow particles substantially not having a communication hole and a defect were obtained in Examples 1 to 9.

REFERENCE SIGNS LIST

1. Aqueous medium
2. Low polarity material
3. Dispersant
4. Monomer composition
4a. Hydrocarbon solvent
4b. Material other than hydrocarbon solvent
4c. Polymerizable monomer dissolved out in aqueous medium
5. Oil-soluble polymerization initiator
6. Shell
8. Hollow portion
10. Droplet
20. Precursor particle
51. Aqueous medium
53. Surfactant
54. Monomer composition 54c. Monomer dissolved out in aqueous medium
55. Water-soluble polymerization initiator
60. Micelle
60a. Micelle precursor
100. Hollow particle

The invention claimed is:

1. A method for producing hollow particles which comprise a resin-containing shell and a hollow portion surrounded by the shell and which have a void ratio of 50% or more and 90% or less, the method comprising:
a suspension step comprising carrying out a suspension treatment of a mixture liquid containing a polymerizable monomer for shell, a polar resin selected from the group consisting of polymers containing a repeating unit which contains a heteroatom, a hydrocarbon solvent, a dispersant, and an aqueous medium to prepare a suspension in which droplets of a monomer composition containing the polymerizable monomer for shell, the polar resin and the hydrocarbon solvent are dispersed in the aqueous medium,
a polymerization step comprising subjecting the suspension to a polymerization reaction, and
a hydrocarbon solvent removal step comprising removing the hydrocarbon solvent included in the hollow particles obtained by the polymerization step,
wherein the polar resin is an acrylic polymer; the acrylic polymer as the polar resin is a copolymer of polymerizable monomers for polar resin, which include a methyl methacrylate and a polar group-containing (meth)acrylic monovinyl monomer; and with respect to a total mass (100% by mass) of the polymerizable monomers for polar resin, a copolymerization ratio of the methyl methacrylate is 50.0% by mass or more and 99.9% by mass or less, and a copolymerization ratio of the polar group-containing (meth)acrylic monovinyl monomer is 0.1% by mass or more and 5.0% by mass or less, and
wherein the dispersant is at least one selected from the group consisting of magnesium hydroxide, calcium hydroxide, barium hydroxide and calcium phosphate.

2. The method for producing the hollow particles according to claim 1, wherein the mixture liquid contains the polar resin in an amount of from 0.1 parts by mass to 10 parts by mass, with respect to 100 parts by mass of the polymerizable monomer for shell.

3. The method for producing the hollow particles according to claim 1, wherein the dispersant is magnesium hydroxide.

4. The method for producing the hollow particles according to claim 1, wherein the polymerizable monomers for shell include, with respect to the total mass (100% by mass) of the polymerizable monomers for shell, a crosslinkable monomer in an amount of 70% by mass or more and 100% by mass or less and a non-crosslinkable monomer in an amount of 0% by mass or more and 30% by mass or less.

* * * * *